(12) United States Patent
Ohta et al.

(10) Patent No.: US 12,501,409 B2
(45) Date of Patent: Dec. 16, 2025

(54) BASE STATION, TERMINAL, AND WIRELESS COMMUNICATION SYSTEM

(71) Applicant: FUJITSU LIMITED, Kawasaki (JP)

(72) Inventors: Yoshiaki Ohta, Yokohama (JP); Tsuyoshi Shimomura, Yokohama (JP)

(73) Assignee: 1FINITY Inc., Kawasaki (JP)

( * ) Notice: Subject to any disclaimer, the term of this patent is extended or adjusted under 35 U.S.C. 154(b) by 365 days.

(21) Appl. No.: 17/505,967

(22) Filed: Oct. 20, 2021

(65) Prior Publication Data

US 2022/0046619 A1 Feb. 10, 2022

Related U.S. Application Data

(63) Continuation of application No. PCT/JP2019/018165, filed on Apr. 26, 2019.

(51) Int. Cl.
*H04W 72/044* (2023.01)
*H04W 74/00* (2009.01)
*H04W 74/0833* (2024.01)
*H04W 74/0838* (2024.01)

(52) U.S. Cl.
CPC ....... *H04W 72/044* (2013.01); *H04W 74/004* (2013.01); *H04W 74/0833* (2013.01); *H04W 74/0838* (2024.01)

(58) Field of Classification Search
None
See application file for complete search history.

(56) References Cited

U.S. PATENT DOCUMENTS

| | | | |
|---|---|---|---|
| 10,893,550 B2 * | 1/2021 | Islam | H04W 72/0446 |
| 12,069,732 B2 * | 8/2024 | Hong | H04W 74/0833 |
| 2018/0176961 A1 * | 6/2018 | Babaei | H04W 74/0833 |
| 2019/0149365 A1 * | 5/2019 | Chatterjee | H04L 25/0226 |
| | | | 370/329 |
| 2019/0215864 A1 * | 7/2019 | Yang | H04W 74/02 |
| 2019/0350002 A1 * | 11/2019 | Chen | H04W 74/0833 |
| 2020/0107369 A1 * | 4/2020 | Jeon | H04W 72/23 |
| 2020/0221504 A1 * | 7/2020 | Cirik | H04L 1/1822 |
| 2021/0136806 A1 * | 5/2021 | Xiong | H04W 72/23 |
| 2021/0153267 A1 * | 5/2021 | Zhang | H04W 72/30 |
| 2022/0039158 A1 * | 2/2022 | Awadin | H04W 74/0866 |

(Continued)

OTHER PUBLICATIONS

International Search Report and Written Opinion of the International Searching Authority issued by the Japan Patent Office for corresponding International Patent Application No. PCT/JP2019/018165, mailed on Jun. 25, 2019, with an English translation.

(Continued)

*Primary Examiner* — Clemence S Han
(74) *Attorney, Agent, or Firm* — Myers Wolin, LLC

(57) ABSTRACT

A terminal capable of performing a random access procedure, the terminal includes a receiver, a controller, and a transmitter. The receiver configured to receive a first signal of the random access procedure from a base station. The controller configured to control a transmission timing at which a second signal of the random access procedure is transmitted according to configuration information associated with a transmission timing. The transmitter configured to transmit, to the base station, the second signal in an unlicensed band at the transmission timing.

15 Claims, 16 Drawing Sheets

(56) References Cited

U.S. PATENT DOCUMENTS

| | | | |
|---|---|---|---|
| 2022/0078851 A1* | 3/2022 | Hong | H04W 16/14 |
| 2022/0095379 A1* | 3/2022 | Xiong | H04W 74/0833 |
| 2022/0116152 A1* | 4/2022 | Iyer | H04L 1/188 |
| 2022/0256595 A1* | 8/2022 | Wang | H04W 74/0866 |

OTHER PUBLICATIONS

3GP TS 36.211 V15.4.0, "3rd Generation Partnership Project; Technical Specification Group Radio Access Network; Evolved Universal Terrestrial Radio Access (E-UTRA); Physical channels and modulation (Release 15)", Dec. 2018.

3GPP TS 36.133 V15.5.0, "3rd Generation Partnership Project; Technical Specification Group Radio Access Network; Evolved Universal Terrestrial Radio Access (E-UTRA); Requirements for support of radio resource management (Release 15)", Dec. 2018.

3GPP TS 36.213 V15.4.0, "3rd Generation Partnership Project; Technical Specification Group Radio Access Network; Evolved Universal Terrestrial Radio Access (E-UTRA); Physical layer procedures (Release 15)", Dec. 2018.

3GPP TS 36.300 V15.4.0, "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 15)", Dec. 2018.

3GPP TS 36.321 V15.4.0, "3rd Generation Partnership Project; Technical Specification Group Radio Access Network; Evolved Universal Terrestrial Radio Access (E-UTRA); Medium Access Control (MAC) protocol specification (Release 15)", Dec. 2018.

3GPP TS 36.322 V15.1.0, "3rd Generation Partnership Project; Technical Specification Group Radio Access Network; Evolved Universal Terrestrial Radio Access (E-UTRA); Radio Link Control (RLC) protocol specification (Release 15)", Jul. 2018.

3GPP TS 36.323 V15.2.0, "3rd Generation Partnership Project; Technical Specification Group Radio Access Network; Evolved Universal Terrestrial Radio Access (E-UTRA); Packet Data Convergence Protocol (PDCP) specification (Release 15)", Dec. 2018.

3GPP TS 36.331 V15.4.0, "3rd Generation Partnership Project; Technical Specification Group Radio Access Network; Evolved Universal Terrestrial Radio Access (E-UTRA); Radio Resource Control (RRC); Protocol specification (Release 15)", Dec. 2018.

3GPP TS 36.413 V15.4.0, "3rd Generation Partnership Project; Technical Specification Group Radio Access Network; Evolved Universal Terrestrial Radio Access Network (E-UTRAN); S1 Application Protocol (S1AP) (Release 15)", Dec. 2018.

3GPP TS 36.423 V15.4.0, "3rd Generation Partnership Project; Technical Specification Group Radio Access Network; Evolved Universal Terrestrial Radio Access Network (E-UTRAN); X2 application protocol (X2AP) (Release 15)", Dec. 2018.

3GPP TS 36.425 V15.0.0, "3rd Generation Partnership Project; Technical Specification Group Radio Access Network; Evolved Universal Terrestrial Radio Access Network (E-UTRAN); X2 interface user plane protocol (Release 15)", Jun. 2018.

3GPP TS 37.340 V15.4.0, "3rd Generation Partnership Project; Technical Specification Group Radio Access Network; Evolved Universal Terrestrial Radio Access (E-UTRA) and NR; Multi-connectivity; Stage 2 (Release 15)", Dec. 2018.

3GPP TS 38.201 V15.0.0, "3rd Generation Partnership Project; Technical Specification Group Radio Access Network; NR; Physical layer; General description (Release 15)", Dec. 2017.

3GPP TS 38.202 V15.4.0, "3rd Generation Partnership Project; Technical Specification Group Radio Access Network; NR; Services provided by the physical layer (Release 15)", Dec. 2018.

3GPP TS 38.211 V15.4.0, "3rd Generation Partnership Project; Technical Specification Group Radio Access Network; NR; Physical channels and modulation (Release 15)", Dec. 2018.

3GPP TS 38.212 V15.4.0, "3rd Generation Partnership Project; Technical Specification Group Radio Access Network; NR; Multiplexing and channel coding (Release 15)", Dec. 2018.

3GPP TS 38.213 V15.4.0, "3rd Generation Partnership Project; Technical Specification Group Radio Access Network; NR; Physical layer procedures for control (Release 15)", Dec. 2018.

3GPP TS 38.214 V15.4.0, "3rd Generation Partnership Project; Technical Specification Group Radio Access Network; NR; Physical layer procedures for data (Release 15)", Dec. 2018.

3GPP TS 38.215 V15.4.0, "3rd Generation Partnership Project; Technical Specification Group Radio Access Network; NR; Physical layer measurements (Release 15)", Dec. 2018.

3GPP TS 38.300 V15.4.0, "3rd Generation Partnership Project; Technical Specification Group Radio Access Network; NR; NR and NG-RAN Overall Description; Stage 2 (Release 15)", Dec. 2018.

3GPP TS 38.321 V15.4.0, "3rd Generation Partnership Project; Technical Specification Group Radio Access Network; NR; Medium Access Control (MAC) protocol specification (Release 15)", Dec. 2018.

3GPP TS 38.322 V15.4.0, "3rd Generation Partnership Project; Technical Specification Group Radio Access Network; NR; Radio Link Control (RLC) protocol specification (Release 15)", Dec. 2018.

3GPP TS 38.323 V15.4.0, "3rd Generation Partnership Project; Technical Specification Group Radio Access Network; NR; Packet Data Convergence Protocol (PDCP) specification (Release 15)", Dec. 2018.

3GPP TS 38.331 V15.4.0, "3rd Generation Partnership Project; Technical Specification Group Radio Access Network; NR; Radio Resource Control (RRC) protocol specification (Release 15)", Dec. 2018.

3GPP TS 38.401 V15.4.0, "3rd Generation Partnership Project; Technical Specification Group Radio Access Network; NG-RAN; Architecture description (Release 15)", Dec. 2018.

3GPP TS 38.410 V15.2.0, "3rd Generation Partnership Project; Technical Specification GroupRadio Access Network; NG-RAN; NG general aspects and principles (Release 15)", Dec. 2018.

3GPP TS 38.413 V15.2.0, "3rd Generation Partnership Project; Technical Specification Group Radio Access Network; NG-RAN; NG Application Protocol (NGAP) (Release 15)", Dec. 2018.

3GPP TS 38.420 V15.2.0, "3rd Generation Partnership Project; Technical Specification Group Radio Access Network; NG-RAN; XN general aspects and principles (Release 15)", Dec. 2018.

3GPP TS 38.423 V15.2.0, "3rd Generation Partnership Project; Technical Specification Group Radio Access Network; NG-RAN; XN application protocol (XnAP) (Release 15)", Dec. 2018.

3GPP TS 38.470 V15.4.0, "3rd Generation Partnership Project; Technical Specification Group Radio Access Network; NG-RAN; F1 general aspects and principles (Release 15)", Dec. 2018.

3GPP TS 38.473 V15.4.1, "3rd Generation Partnership Project; Technical Specification Group Radio Access Network; NG-RAN; F1 application protocol (F1AP) (Release 15)", Jan. 2019.

3GPP TR 38.801 V14.0.0, "3rd Generation Partnership Project; Technical Specification Group Radio Access Network; Study on new radio access technology: Radio access architecture and interfaces (Release 14)", Mar. 2017.

3GPP TR 38.802 V14.2.0, "3rd Generation Partnership Project; Technical Specification Group Radio Access Network; Study on New Radio Access Technology Physical Layer Aspects (Release 14)", Sep. 2017.

3GPP TR 38.803 V14.2.0, "3rd Generation Partnership Project; Technical Specification Group Radio Access Network; Study on new radio access technology: Radio Frequency (RF) and co-existence aspects (Release 14)", Sep. 2017.

3GPP TR 38.804 V14.0.0, "3rd Generation Partnership Project; Technical Specification Group Radio Access Network; Study on New Radio Access Technology; Radio Interface Protocol Aspects (Release 14)", Mar. 2017.

3GPP TR 38.889 V16.0.0, "3rd Generation Partnership Project; Technical Specification Group Radio Access Network; Study on NR-based access to unlicensed spectrum (Release 16)", Dec. 2018.

3GPP TR 38.900 V15.0.0, "3rd Generation Partnership Project; Technical Specification Group Radio Access Network; Study on channel model for frequency spectrum above 6 GHZ (Release 15)", Jun. 2018.

(56) References Cited

OTHER PUBLICATIONS

3GPP TR 38.912 V15.0.0, "3rd Generation Partnership Project; Technical Specification Group Radio Access Network; Study on New Radio (NR) access technology (Release 15)", Jun. 2018.

3GPP TR 38.913 V15.0.0, "3rd Generation Partnership Project; Technical Specification Group Radio Access Network; Study on Scenarios and Requirements for Next Generation Access Technologies; (Release 15)", Jun. 2018.

OPPO, "Summary of Email discussion [105#50][NR-U] RACH 4-step and SR", Agenda Item: 11.2.1.1, 3GPP TSG-RAN WG2 Meeting #105bis, R2-1903282, Xi'an, China, Apr. 6-12, 2019.

Samsung, "Signaling Multiple UL grants for Msg3 Transmission in NR-U", Agenda Item: 11.2.1.1, 3GPP TSG-RAN2 Meeting #105bis, R2-1903101, Xi'an, China, Apr. 8-12, 2019.

ZTE Corporation, et al., "4-step RACH procedure for NR-U", Agenda Item: 11.2.1.1, 3GPP TSG-RAN WG2 NR Meeting #105bis, R2-1903537, Xi'an, China, Apr. 8-12, 2019.

3GPP TS 36.212 V15.4.0, "3rd Generation Partnership Project; Technical Specification Group Radio Access Network; Evolved Universal Terrestrial Radio Access (E-UTRA); Multiplexing and channel coding (Release 15)", Dec. 2018.

Notice of Reasons for Refusal issued by the Japan Patent Office for corresponding Japanese Patent Application No. 2021-515765, dated Jan. 31, 2023, with an English machine translation.

First Notification of Office Action and Search Report issued by the China National Intellectual Property Administration for corresponding Chinese Patent Application No. 201980095657.1, dated Apr. 22, 2023, with an English translation.

Notice of Reasons for Refusal issued by the Japan Patent Office for corresponding Japanese Patent Application No. 2021-515765, dated Oct. 18, 2022, with an English translation.

Second Notification of Office Action issued by the China National Intellectual Property Administration for corresponding Chinese Patent Application No. 201980095657.1, dated Sep. 1, 2023, with an English translation.

* cited by examiner

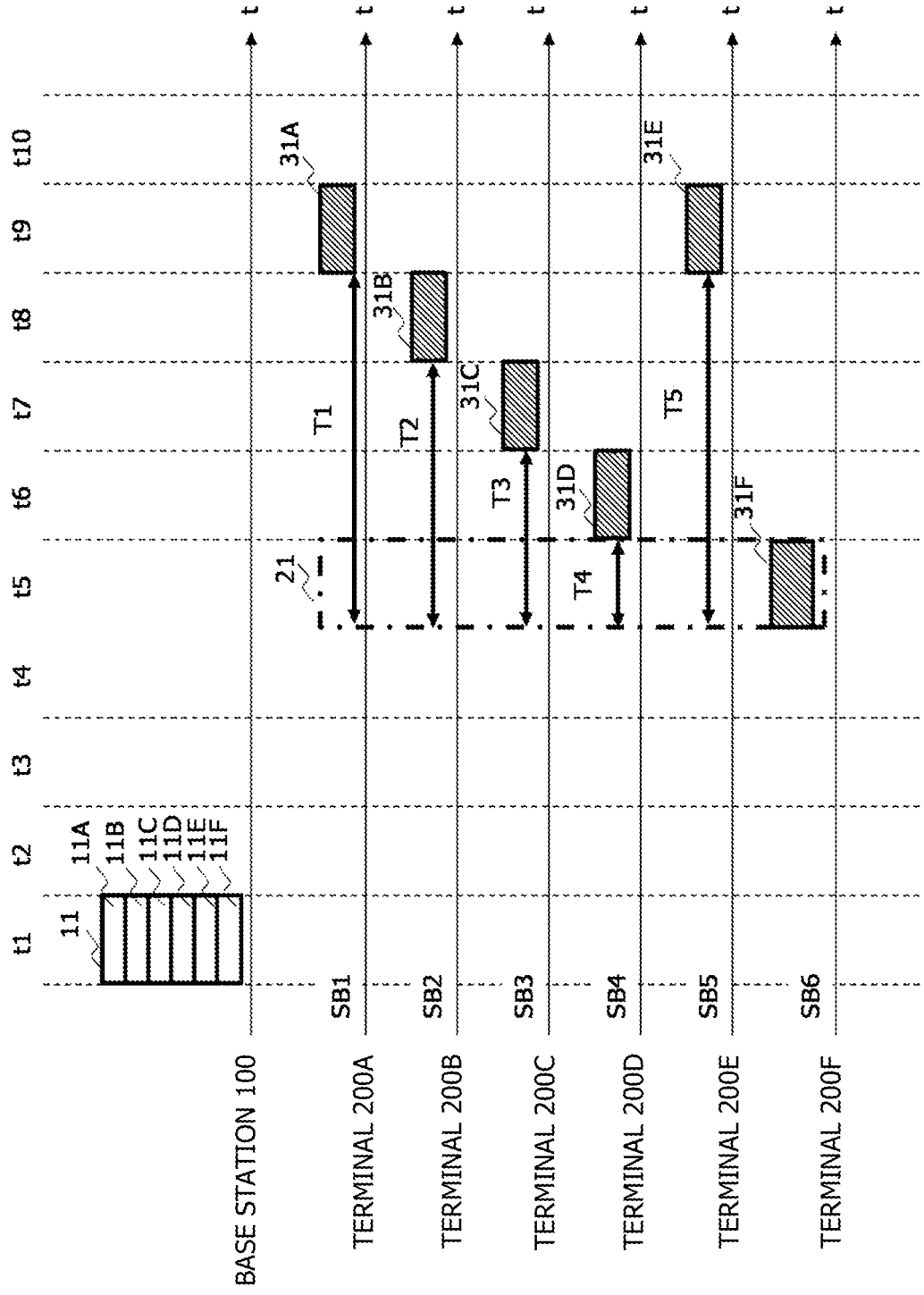

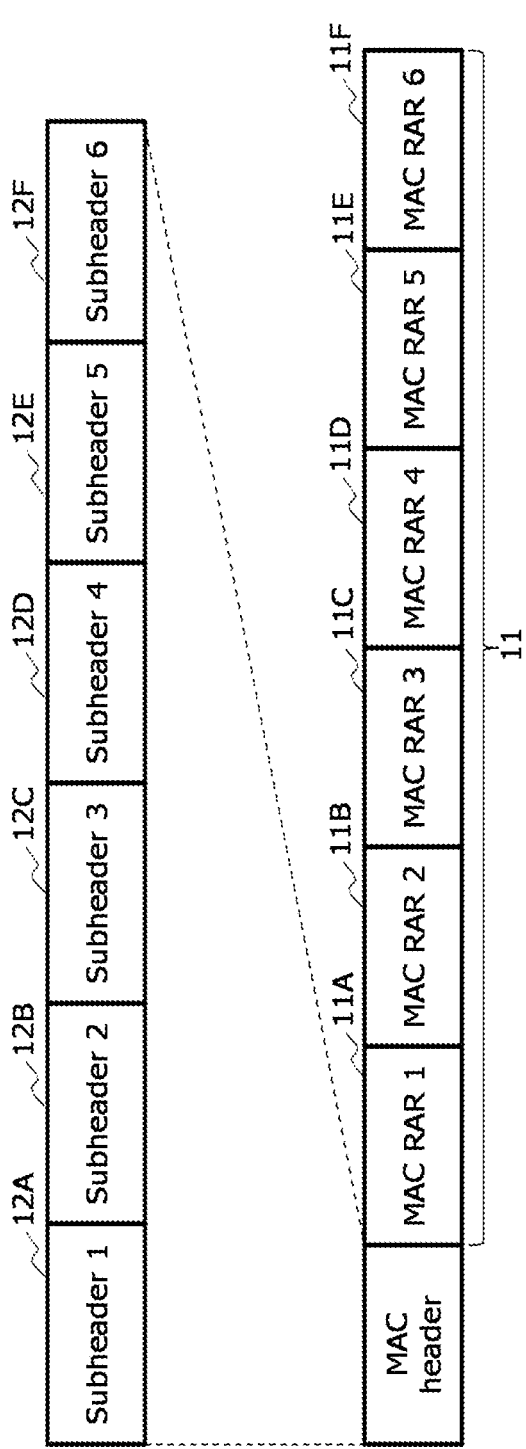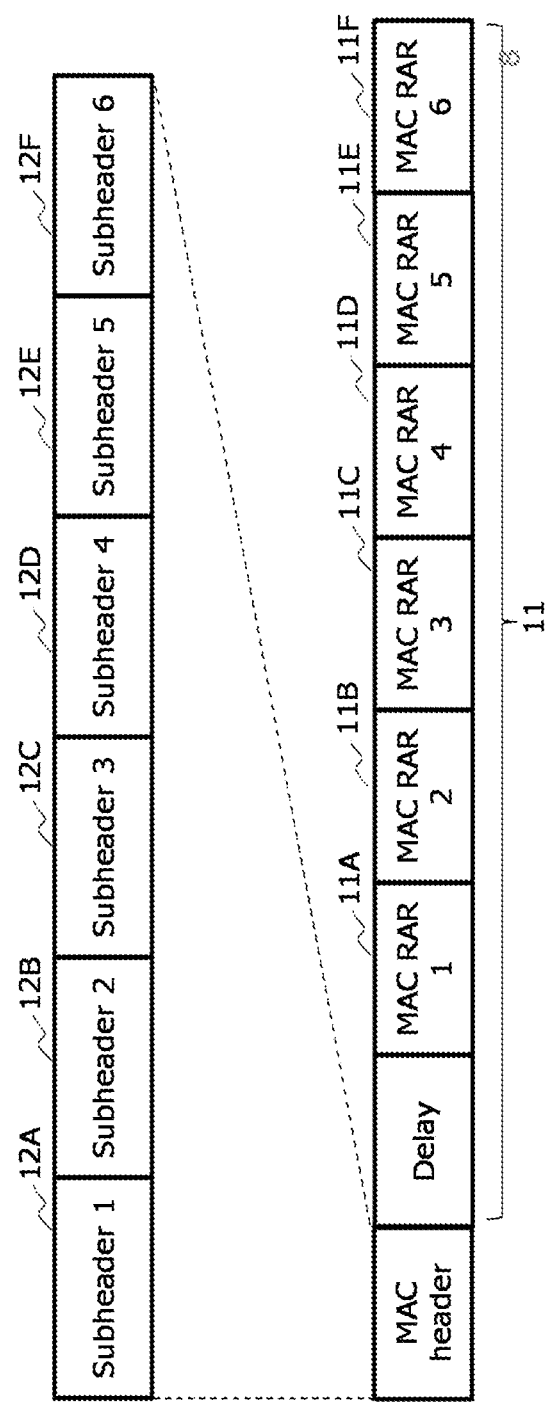
FIG. 8A
FIG. 8B

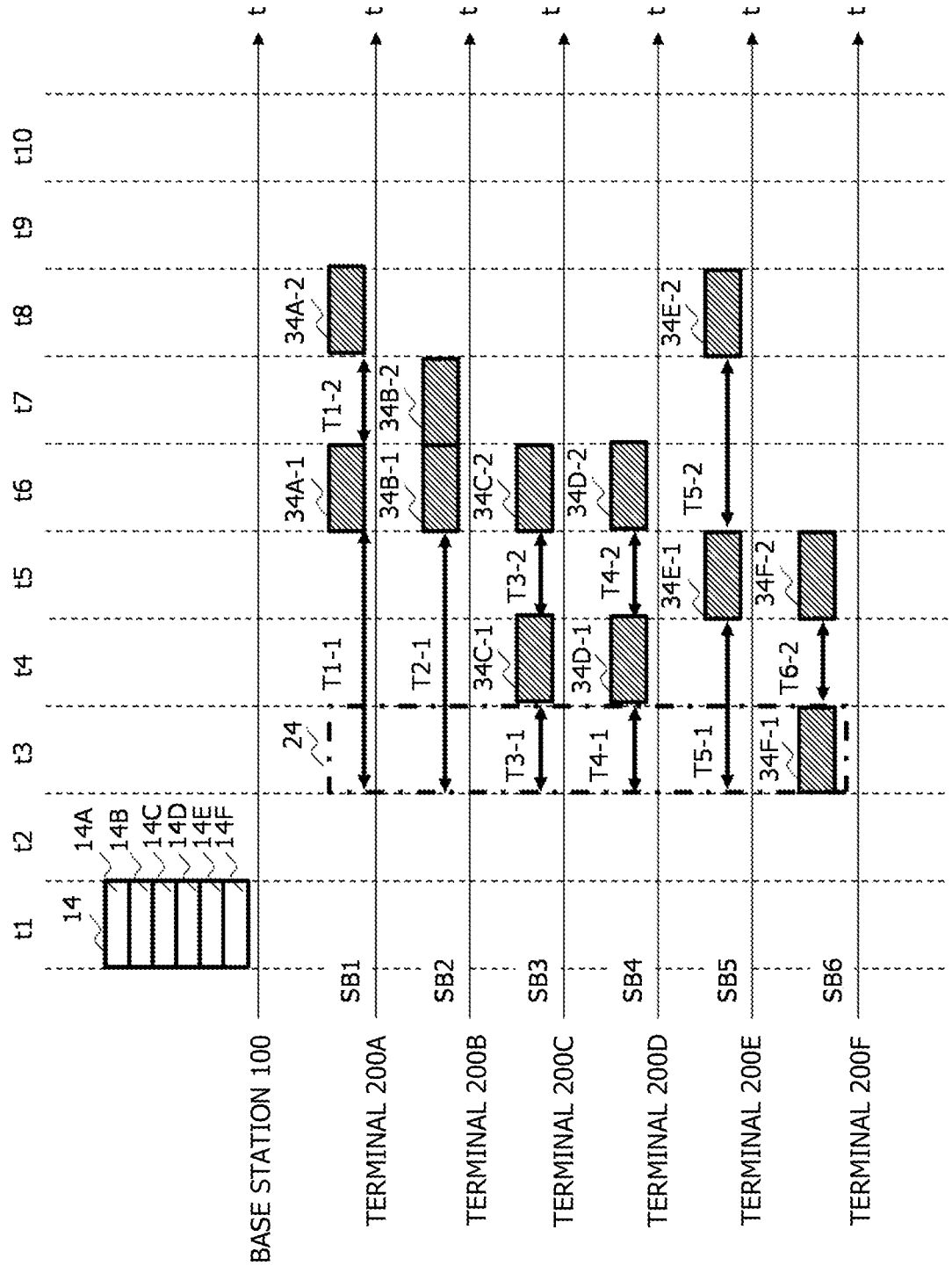

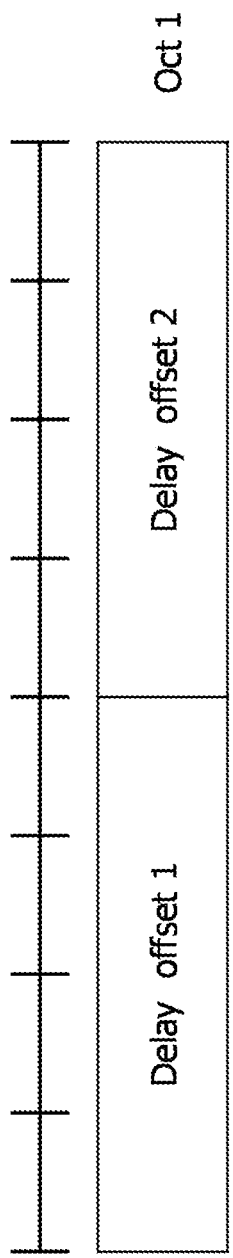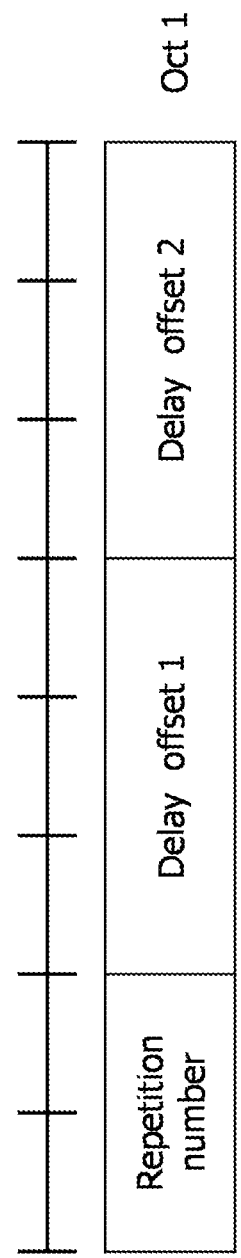
FIG. 13A
FIG. 13B

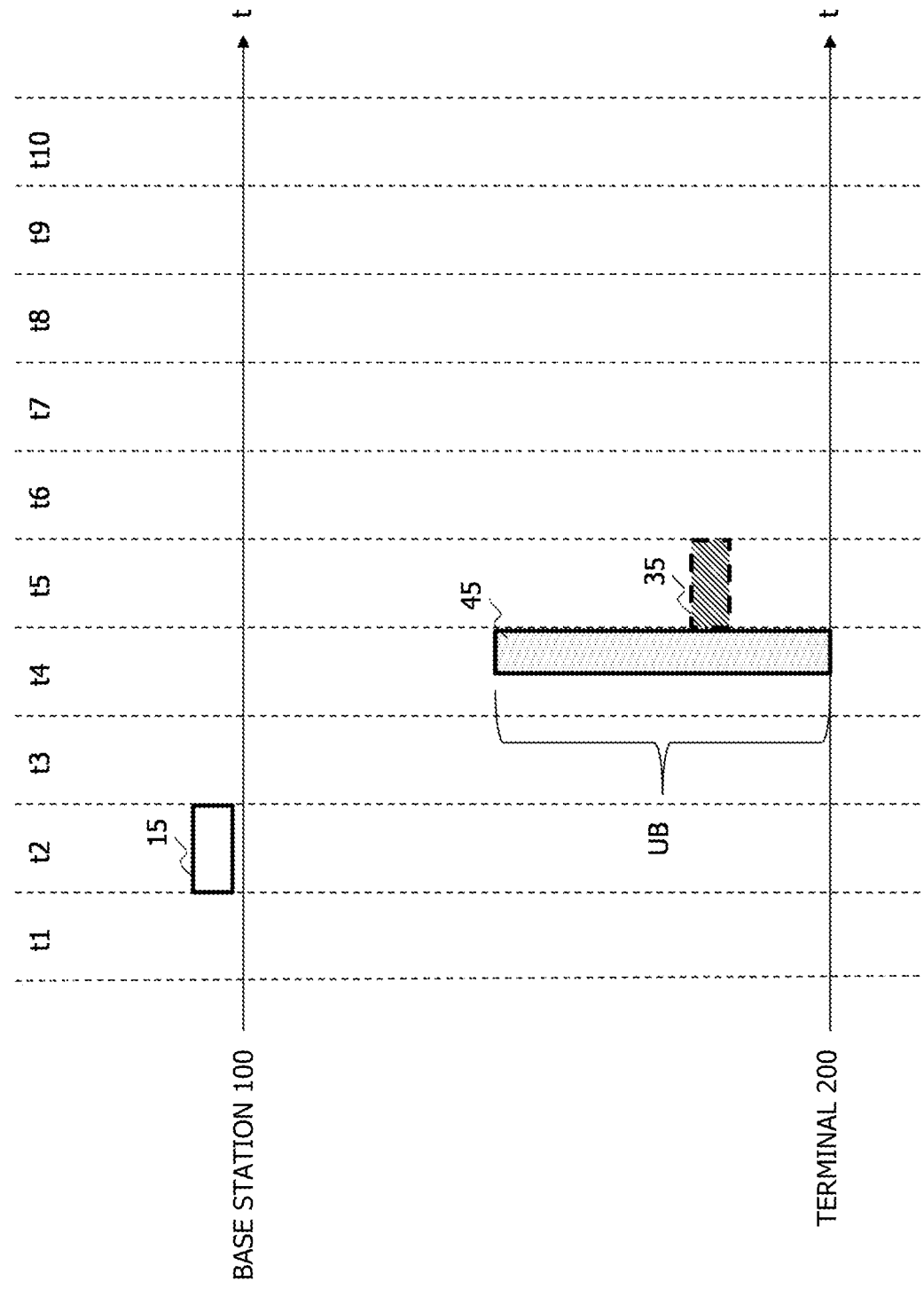

BASE STATION, TERMINAL, AND WIRELESS COMMUNICATION SYSTEM

CROSS-REFERENCE TO RELATED APPLICATION

This application is a continuation application of International Application PCT/JP2019/018165 filed on Apr. 26, 2019 and designated the U.S., the entire contents of which are incorporated herein by reference.

FIELD

The present invention relates to a base station, a terminal, and a wireless communication system.

BACKGROUND

In recent years, in order to further increase the speed and capacity of wireless communication in wireless communication systems such as mobile phone systems, discussions about next-generation wireless communication technology have been held. For example, in the communication standard of the fifth-generation mobile communication system (5G or New Radio (NR)), it has been demanded that, in addition to the fourth-generation mobile communication system (4G), standard techniques (NPL 1-11), techniques, which achieve a higher data rate, a lager capacity, and lower latency. Note that, regarding the fifth-generation communication standard, the third generation partnership project (3GPP) working groups (e.g., TSG-RAN WG1, TSG-RAN WG2, etc.) is proceeding with technical studies, and the first edition of the standard specifications was issued at the end of 2017, which has been revised as needed.

In the wireless communication system, a channel is prepared for a terminal to first perform transmission when a base station and a mobile station start communication. In 3GPP, this is called a random access channel (RACH), and a procedure to start communication according to the RACH is called a random access procedure. The RACH contains information called a preamble as information for the base station to identify wireless signals transmitted by the mobile station. This information allows the base station to identify the terminal.

The random access procedure is performed when initial access is performed, when data signals are generated, when synchronization at the time of handover is established, and the like. Note that, for the random access in the case where the initial access is performed and uplink data signals are occurred, the terminal selects and uses one preamble from multiple preambles (this is called contention-based random access procedure).

In the contention-based random access procedure, multiple mobile stations may transmit preambles using the same RACH resource and at the same time, although the probability is low. Meanwhile, in the case of establishing synchronization when downlink data signals are occurred or in the case of establishing synchronization with a target base station at the time of handover, it is performed with a method in which the base station assigns an individual signature unique to the terminal (this is called non-contention-based random access procedure).

The contention-based random access procedure will be briefly described. In the contention-based random access procedure, first, the terminal transmits a randomly selected preamble to the base station to start the random access procedure (referred to as message 1 or random access preamble). Next, the base station transmits a response to the message 1 together with synchronization signals for uplink communication, transmission permission, and the like (referred to as message 2 or random access response).

Next, the terminal transmits valid mobile station ID and the like to the base station (referred to as message 3 or scheduled transmission). Note that, when preamble collision occurs in the message 1, the base station fails to decode the signals (message 3) and fails to perform reception, whereby it is enabled to recognize that the preamble collision has occurred. The base station transmits, to the terminal, information regarding whether or not the message 3 has been successfully received (referred to as message 4 or contention resolution). Note that, in a case where the base station has successfully received the message 3 in the contention-based random access procedure of the case of performing initial access, new uplink transmission is notified by the PDCCH. Furthermore, when the base station has successfully received the message 3 in the non-contention-based random access procedure in a case where uplink data signals are occurred, a valid identifier (ID) of the terminal is notified by the PDSCH. Note that, in a case where the base station has failed to receive the message 3, the terminal performs a non-adaptive hybrid automatic repeat request (HARQ).

Next, the non-contention-based random access procedure will be briefly described. An assignment of an individual signature is transmitted in advance (referred to as message 0 or random access preamble assignment). The terminal transmits the individual preamble with the RACH (referred to as message 1 or random access preamble). The base station transmits response signals to the message 1 together with synchronization signals for uplink communication, transmission permission, and the like (referred to as message 2 or random access response).

In this manner, the terminal and the base station establish synchronization and perform data signal communication.

After the random access is complete, the uplink synchronization state transitions from out of synchronous to synchronous. The base station transmits downlink data signals to the mobile station using the PDSCH. Note that the wireless resources and the MCS used by the PDSCH are transmitted with the PDCCH associated with the PDSCH. When the mobile station has succeeded in receiving the downlink data signals, the uplink has transitioned to the synchronous state, whereby it is possible to return acknowledgement (ACK) signals to the base station.

In 4G and 5G, communication using a frequency band (unlicensed band) that requires no license is defined. In the communication using the unlicensed band, carrier sensing (CS) is performed before transmitting signals in the unlicensed band. Then, when the unlicensed band is idle as a result of the carrier sensing, the communication device transmits data signals.

Furthermore, in the fourth-generation mobile communication and the fifth-generation mobile communication, a technique of performing communication using a carrier wave of a frequency band requiring a license (licensed band) and a carrier wave of a frequency band requiring no license is defined. The technique is called licensed assisted access (LAA).

In the LAA, for example, in a case where the terminal transmits data signals using the unlicensed band, the terminal receives, from the base station, a PDCCH including resource allocation information in the licensed band. The terminal performs listen before talk (LBT) in the unlicensed band corresponding to the resource allocation information.

Then, when the unlicensed band is idle as a result of the LBT, the terminal transmits data signals with the resource.

Note that, in the 3GPP, the use of the unlicensed band in the random access procedure has been discussed at present.

Related techniques are disclosed in for example 3GPP TS 36.133 V15.5.0 (2018 December), 3GPP TS 36.211 V15.4.0 (2018 December), 3GPP TS 36.212 V15.4.0 (2018 December), 3GPP TS 36.213 V15.4.0 (2018 December), 3GPP TS 36.300 V15.4.0 (2018 December), 3GPP TS 36.321 V15.4.0 (2018 December), 3GPP TS 36.322 V15.1.0 (2018 July), 3GPP TS 36.323 V15.2.0 (2018 December), 3GPP TS 36.331 V15.4.0 (2018 December), 3GPP TS 36.413 V15.4.0 (2018 December), 3GPP TS 36.423 V15.4.0 (2018 December), 3GPP TS 36.425 V15.0.0 (2018 June), 3GPP TS 37.340 V15.4.0 (2018 December), 3GPP TS 38.201 V15.0.0 (2017 December), 3GPP TS 38.202 V15.4.0 (2018 December), 3GPP TS 38.211 V15.4.0 (2018 December), 3GPP TS 38.212 V15.4.0 (2018 December), 3GPP TS 38.213 V15.4.0 (2018 December), 3GPP TS 38.214 V15.4.0 (2018 December), 3GPP TS 38.215 V15.4.0 (2018 December), 3GPP TS 38.300 V15.4.0 (2018 December), 3GPP TS 38.321 V15.4.0 (2018 December), 3GPP TS 38.322 V15.4.0 (2018 December), 3GPP TS 38.323 V15.4.0 (2018 December), 3GPP TS 38.331 V15.4.0 (2018 December), 3GPP TS 38.401 V15.4.0 (2018 December), 3GPP TS 38.410 V15.2.0 (2018 December), 3GPP TS 38.413 V15.2.0 (2018 December), 3GPP TS 38.420 V15.2.0 (2018 December), 3GPP TS 38.423 V15.2.0 (2018 December), 3GPP TS 38.470 V15.4.0 (2018 December), 3GPP TS 38.473 V15.4.1 (2019 January), 3GPP TR 38.801 V14.0.0 (2017 March), 3GPP TR 38.802 V14.2.0 (2017 September), 3GPP TR 38.803 V14.2.0 (2017 September), 3GPP TR 38.804 V14.0.0 (2017 March), 3GPP TR 38.900 V15.0.0 (2018 June), 3GPP TR 38.912 V15.0.0 (2018 June), 3GPP TR 38.913 V15.0.0 (2018 June), 3GPP TR 38.889 V16.0.0 (2018 December), and Summary of Email discussion [105#50] [NR-U] RACH 4-step and SR, R2-1903282, OPPO, 3GPP TSG-RAN WG2 Meeting #105bis, Xi'an, China, 6th-12 Apr. 2019.

SUMMARY

According to an aspect of the embodiments, a terminal capable of performing a random access procedure, the terminal includes a receiver configured to receive a first signal of the random access procedure from a base station; a controller configured to control a transmission timing at which a second signal of the random access procedure is transmitted according to configuration information associated with a transmission timing; and a transmitter configured to transmit, to the base station, the second signal in an unlicensed band at the transmission timing.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 7 is a diagram illustrating an exemplary operation flow of a wireless communication system according to the second embodiment;

FIG. 8A is a diagram illustrating exemplary concatenation of MAC PDUs according to the second embodiment;

FIG. 8B is a diagram illustrating exemplary concatenation of MAC PDUs according to the second embodiment;

FIG. 12 is a diagram illustrating an exemplary operation flow of a wireless communication system according to a fourth embodiment;

FIG. 13A is a diagram illustrating exemplary MAC PDU configuration of a MAC PDU Delay;

FIG. 13B is a diagram illustrating exemplary MAC PDU configuration of a MAC PDU Delay;

FIG. 14 is a diagram illustrating an exemplary operation flow of a wireless communication system according to a sixth embodiment;

DESCRIPTION OF EMBODIMENTS

In the 3GPP, while it is currently discussed to transmit signals transmitted from the terminal in the random access procedure in the unlicensed band, a specific method has not been determined. Communication using the unlicensed band may be affected by other wireless communication systems as compared with communication using the licensed band, and thus it is highly likely that signal transmission fails/delays. When the random access procedure fails (e.g., if synchronization fails), the random access procedure is restarted from the beginning (e.g., in the contention-based random access, it retries from transmission of message 1). Therefore, the random access procedure using the unlicensed band may take time longer than that of the random access procedure using the licensed band until data communication between communication devices (e.g., terminal and base station) becomes available.

Accordingly, a method for performing the random access procedure using the unlicensed band efficiently is desired.

Hereinafter, the present embodiments will be described in detail with reference to the drawings. Problems and embodiments in the present specification are merely examples, and do not limit the scope of rights of the present application. For example, as long as the described expressions are technically equivalent even if they are different, such different expressions do not limit the scope of rights and the techniques of the present application may be applied. In addition, each of the embodiments may be suitably combined within a range that does not cause contradiction between individual processing.

Furthermore, terms and technical contents described in specifications and contributions as standards related to communication such as 3GPP may be appropriately used as the used terms and the described technical contents in the present specification. Examples of such a specification include 3GPP TS 38.211 V15.4.0 set forth in the citation list.

First Embodiment

A first embodiment describes an embodiment in which a band for transmitting signals from a terminal to a base station in a random access procedure uses a license-unrequested band (hereinafter referred to as unlicensed band). Specifically, at a time of transmitting signals related to the random access procedure in the unlicensed band, the terminal transmits the signals in resources of the unlicensed band according to configuration information. Note that the unlicensed band indicates a frequency shared by multiple wireless communication systems, and indicates a frequency that can be shared by Wi-Fi and base stations of other vendors, for example. Furthermore, the resources referred to here are determined by a frequency axis and a time axis.

Figure 1:
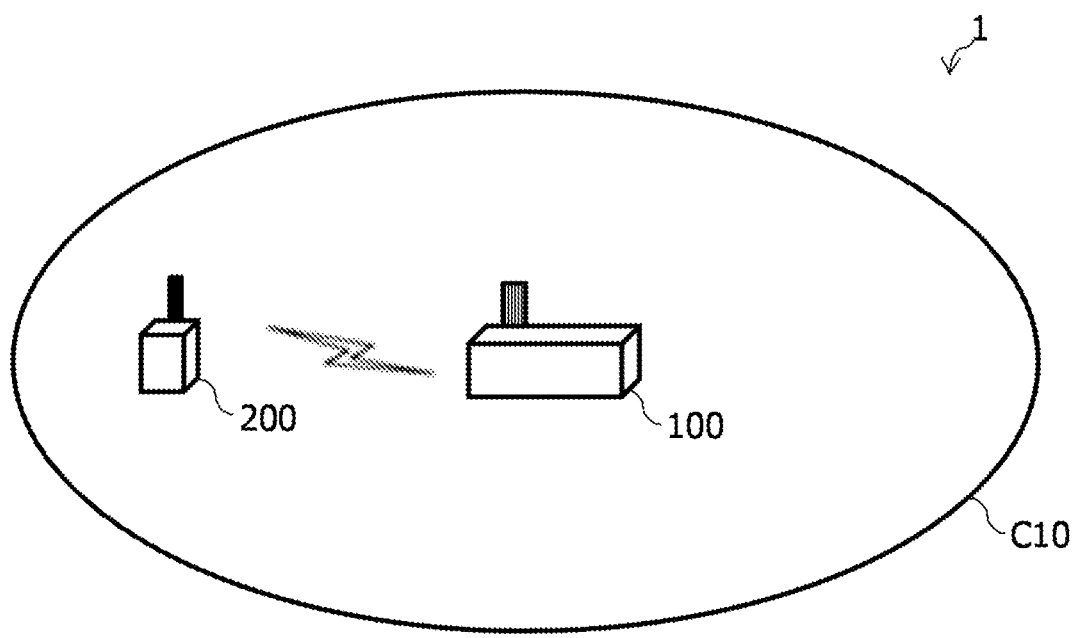
FIG. 1 is a diagram illustrating an exemplary network configuration according to a first embodiment.

FIG. 1 illustrates a wireless communication system 1 according to the first embodiment. The wireless communication system 1 includes a base station 100 and a terminal 200. The base station 100 forms a cell C10. The terminal 200 is assumed to exist in the cell C10.

Note that the base station 100 may be, for example, a wireless base station of various scales in addition to a macro wireless base station and a small wireless base station such as a pico wireless base station (including micro wireless base station, femto wireless base station, etc.), and may be described by other terms such as a wireless communication device, a communication device, a transmission device, or the like. Furthermore, the terminal 200 may be, for example, a mobile phone, a smartphone, a personal digital assistant (PDA), a personal computer, various devices of a vehicle or the like having a wireless communication function, or a wireless terminal of an apparatus (sensor device, etc.) or the like, and may also be referred to as a wireless communication device, a communication device, a receiving device, a mobile station, or the like.

The base station 100 is connected to a network via wired connection with a network device (host device or another base station) (not illustrated). Note that the base station 100 may be connected to the network device wirelessly instead of wired connection.

The base station 100 may be set as separate devices by separating the wireless communication function with the terminal 200 and the digital signal processing and control functions. In this case, the device having the wireless communication function may be called a remote radio head (RRH), and the device having the digital signal processing and control functions may be called a base band unit (BBU). Furthermore, the RRH may be installed to project from the BBU, and an optical fiber or the like may be used for wired connection therebetween. Alternatively, they may be connected wirelessly. Furthermore, instead of the RRH and BBU described above, it may be separated into two including a central unit and a distributed unit, for example. While the distributed unit includes at least an RF wireless circuit, in addition to that, a wireless physical layer (or layer 1) function, a MAC layer function, and an RLC function may be further included.

Meanwhile, the terminal 200 communicates with the base station 100 by wireless communication. Furthermore, in a case of not being synchronized with the base station 100, it may be synchronized with the base station 100 using the random access procedure.

Figure 2:
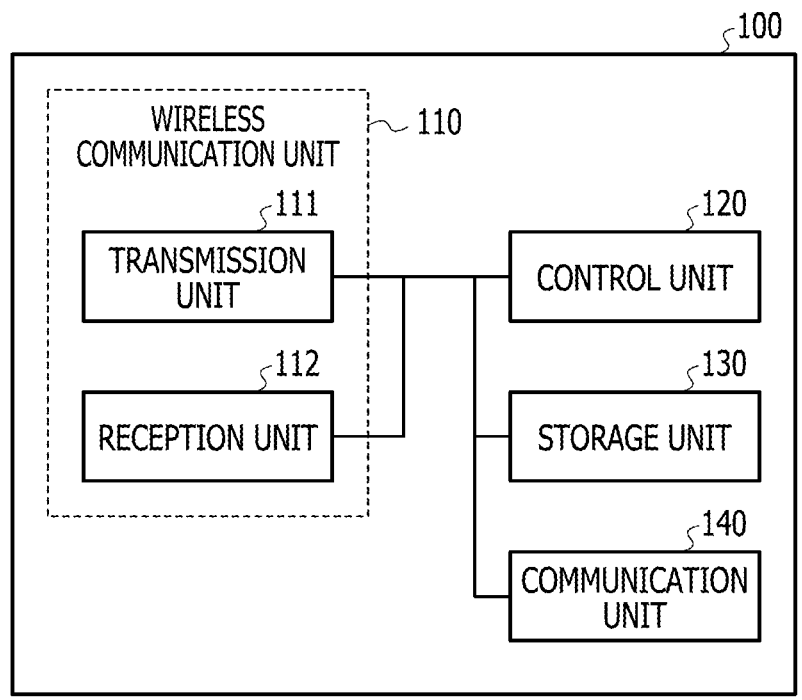
FIG. 2 is an exemplary functional structure diagram of a base station in a wireless communication system according to the first embodiment.

Next, the base station 100 will be described. FIG. 2 illustrates an exemplary functional block structure of the base station 100. The base station 100 includes a wireless communication unit 110, a control unit 120, a storage unit 130, and a communication unit 140.

The wireless communication unit 110 includes a transmission unit 111 and a reception unit 112, and performs wireless communication with the terminal 200. Specifically, the transmission unit 111 is capable of transmitting, to the terminal 200, signals of the random access procedure, downlink data signals, and downlink control signals (hereinafter may be referred to as physical downlink control channel (PDCCH)) in a license-requested band (hereinafter referred to as licensed band) or in an unlicensed band. Furthermore, the reception unit 112 is capable of receiving, from the terminal 200, signals of the random access procedure, uplink data signals, and uplink control signals (hereinafter may be referred to as physical uplink control channel (PUCCH)) transmitted using the licensed band or the unlicensed band.

The control unit 120 controls the base station 100. Specifically, the control unit 120 is capable of performing control such as, at the time of being out of synchronous state with the terminal 200, execution control of the random access procedure, signal processing of the signals received by the reception unit 112, creation of a transport block (TB), mapping of the transport block to a wireless resource, and the like. Furthermore, the control unit 120 is capable of performing control to execute carrier sensing using the reception unit 112.

The storage unit 130 is capable of storing downlink data signals, for example.

The communication unit 140 connects to a network device (e.g., host device or another base station device) by wire or wirelessly to perform communication. The data signals toward the terminal 200, which have been received by the communication unit 140, may be stored in the storage unit 130.

Figure 3:
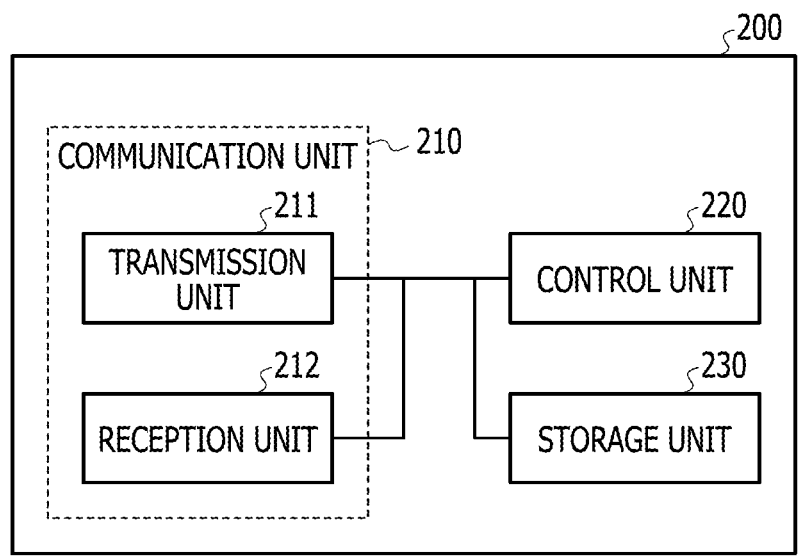
FIG. 3 is an exemplary functional structure diagram of a terminal in the wireless communication system according to the first embodiment.

Next, the terminal 200 will be described. FIG. 3 is an exemplary functional structure diagram of the terminal 200 in the wireless communication system according to the first embodiment. As illustrated in FIG. 3, the terminal 200 includes a communication unit 210, a control unit 220, and a storage unit 230. Each of those components is connected in such a manner that signals and data can be input/output unidirectionally or bidirectionally. Note that the communication unit 210 may be described separately as a transmission unit 211 and a reception unit 212.

The transmission unit 211 transmits data signals and control signals via an antenna by wireless communication. Note that the antenna may be common to both transmission and reception. The transmission unit 211 transmits, for example, signals related to the random access procedure, uplink data signals, uplink control signals, and response signals to downlink data signals in the licensed band or in the unlicensed band.

The reception unit 212 receives signals transmitted from the base station 100 via the licensed band or the unlicensed band. Specifically, it receives signals of the random access procedure, downlink data signals, downlink control signals, and the like. Furthermore, the signals to be received may include, for example, reference signals to be used for channel estimation and demodulation.

The control unit 220 controls the terminal 200. Specifically, the control unit 220 is capable of performing control such as execution control of the random access procedure with the base station 100, signal processing of the signals received by the reception unit 212, creation of a transport block (TB), mapping of the transport block to a wireless resource, and the like. Furthermore, the control unit 220 is capable of performing control to perform carrier sensing (or Listen Before Talk (LBT)) using the reception unit 212.

The storage unit 230 is capable of storing uplink data signals, for example. Furthermore, the storage unit 230 is capable of storing configuration information (or setting information) related to wireless communication transmitted from the base station 100.

Next, a case where the terminal 200 transmits, to the base station 100, signals of the random access procedure using the unlicensed band will be described with reference to FIG. 4.

Figure 4:
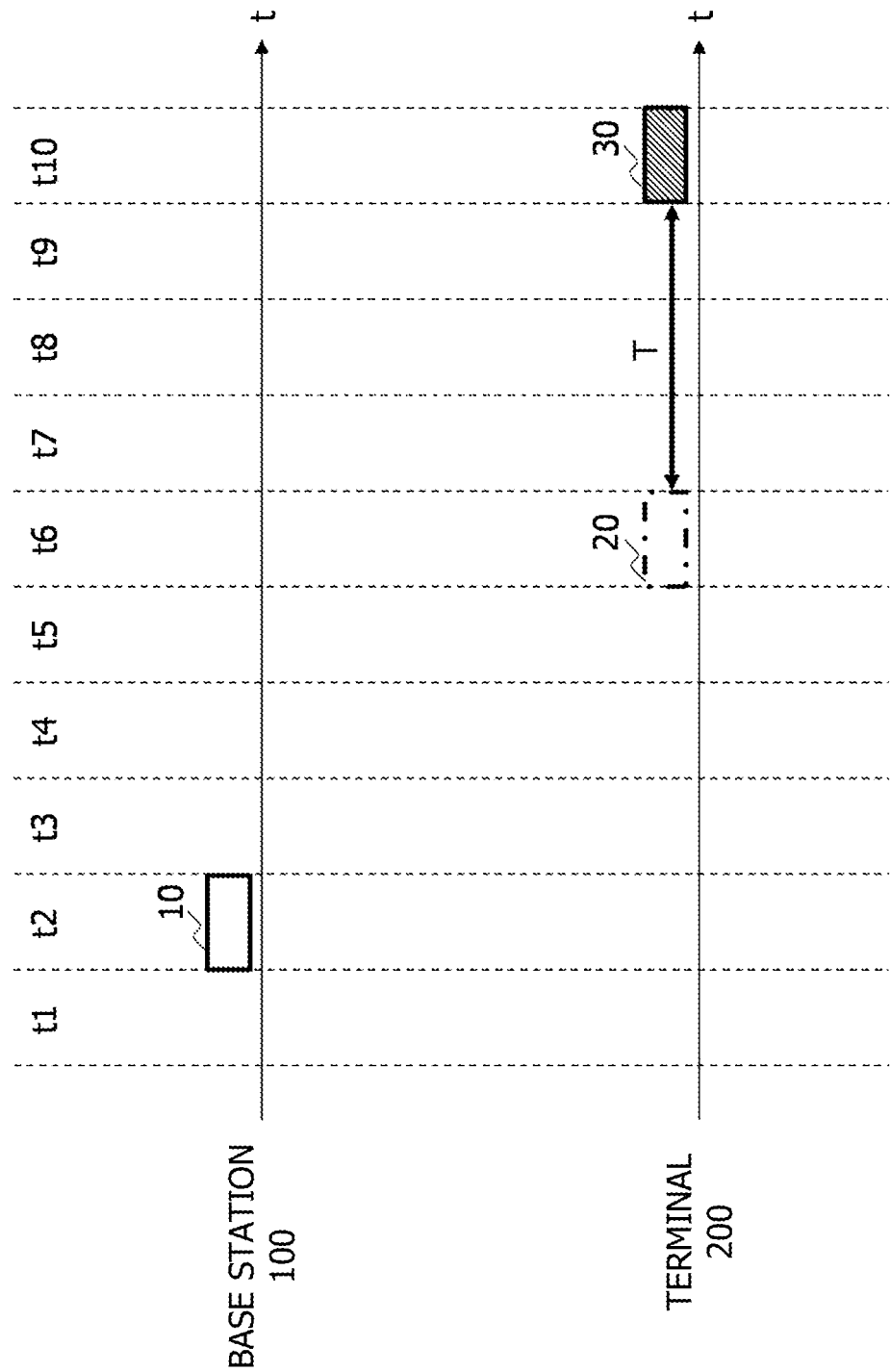
FIG. 4 is a diagram illustrating an exemplary operation flow of the wireless communication system according to the first embodiment.

In FIG. 4, the upper row illustrates operation of the base station 100, and the lower row illustrates operation of the terminal 200. Furthermore, in FIG. 4, the horizontal axis represents a flow of time, and each of t1 to t10 represents a predetermined time unit such as a mini-slot, slot, or subframe unit defined by 3GPP, for example. Note that the base station 100 transmits the signals related to the random access procedure in an unlicensed carrier or a licensed carrier.

For example, as illustrated in FIG. 4, the base station 100 transmits the signals related to the random access procedure from the transmission unit 111 to the terminal 200 using a resource 10 at the timing t2. Note that the signals related to the random access procedure transmitted from the base station 100 may be called a random access message (e.g., message 0, message 2), for example.

When the reception unit 212 of the terminal 200 receives the signals related to the random access procedure transmitted from the transmission unit 111 of the base station 100, the control unit 220 controls the transmission timing of the signals related to the random access procedure to be transmitted from the transmission unit 211 according to information indicating the transmission timing.

Specifically, the control unit 220 performs control to transmit, according to the information indicating the transmission timing, the signals related to the random access procedure from the transmission unit 211 using a resource 30 in the unlicensed band, which is a transmission timing offset by a period of T from a resource 20 (described as a resource at t6 after four subframes in FIG. 4) determined based on the configuration information. Note that, although the resource 20 is described to be at t6 after four subframes, it is not limited thereto, and for example, it may be changed according to a subcarrier spacing, changed based on allocation information from the base station, or changed based on the subcarrier spacing and the allocation information from the base station. Note that the subcarrier spacing indicates Δ (delta) defined in TS 38.211 and the like.

Note that the control unit 220 does not necessarily perform carrier sensing (or LBT) in the unlicensed band before performing transmission from the terminal 200 to the base station 100 in the random access procedure. For example, signals are transmitted using the unlicensed band without performing carrier sensing.

With such an arrangement, it becomes possible to set the signals related to the random access procedure to be transmitted from the terminal 200 at the timing corresponding to the information associated with the transmission timing, which is the configuration information. Therefore, it becomes possible to change the signals of the random access procedure to be transmitted by the terminal 200 in the unlicensed band from the original position. As a result, the timing at which the signals of the random access procedure to be transmitted by the terminal 200 in the unlicensed band becomes flexible. As a result, the probability of failure in the random access procedure using the unlicensed band is lowered.

Note that, although the information associated with the transmission timing has been described as an example of the configuration information, a frequency in the unlicensed band may be changed. For example, when the frequency of the unlicensed band of 4 mega is allocated, the control unit 220 of the terminal 200 may select 2 mega therefrom and control transmission. Furthermore, the control unit 220 may perform control to change both the frequency and time. In short, the control unit 220 may control to carry out transmission at a timing that is according to the information of the transmission and a frequency of the unlicensed band within a changeable range (selectable change).

The first embodiment has been described above. As is clear from the descriptions above, according to the wireless communication system 1 of the present embodiment, it becomes possible to make a resource for transmitting the signals of the random access procedure transmitted by the terminal 200 in the unlicensed band flexible. Accordingly, it becomes possible to perform the random access procedure using the unlicensed band efficiently.

Second Embodiment

In the first embodiment, an exemplary case of performing control in such a manner that the transmission timing of the signals of the random access procedure transmitted from the terminal 200 is changed according to the information associated with the transmission timing has been described. In a second embodiment, an exemplary case of presenting a transmission timing of a specific message in multiple terminal random access procedures will be described.

Figure 5:
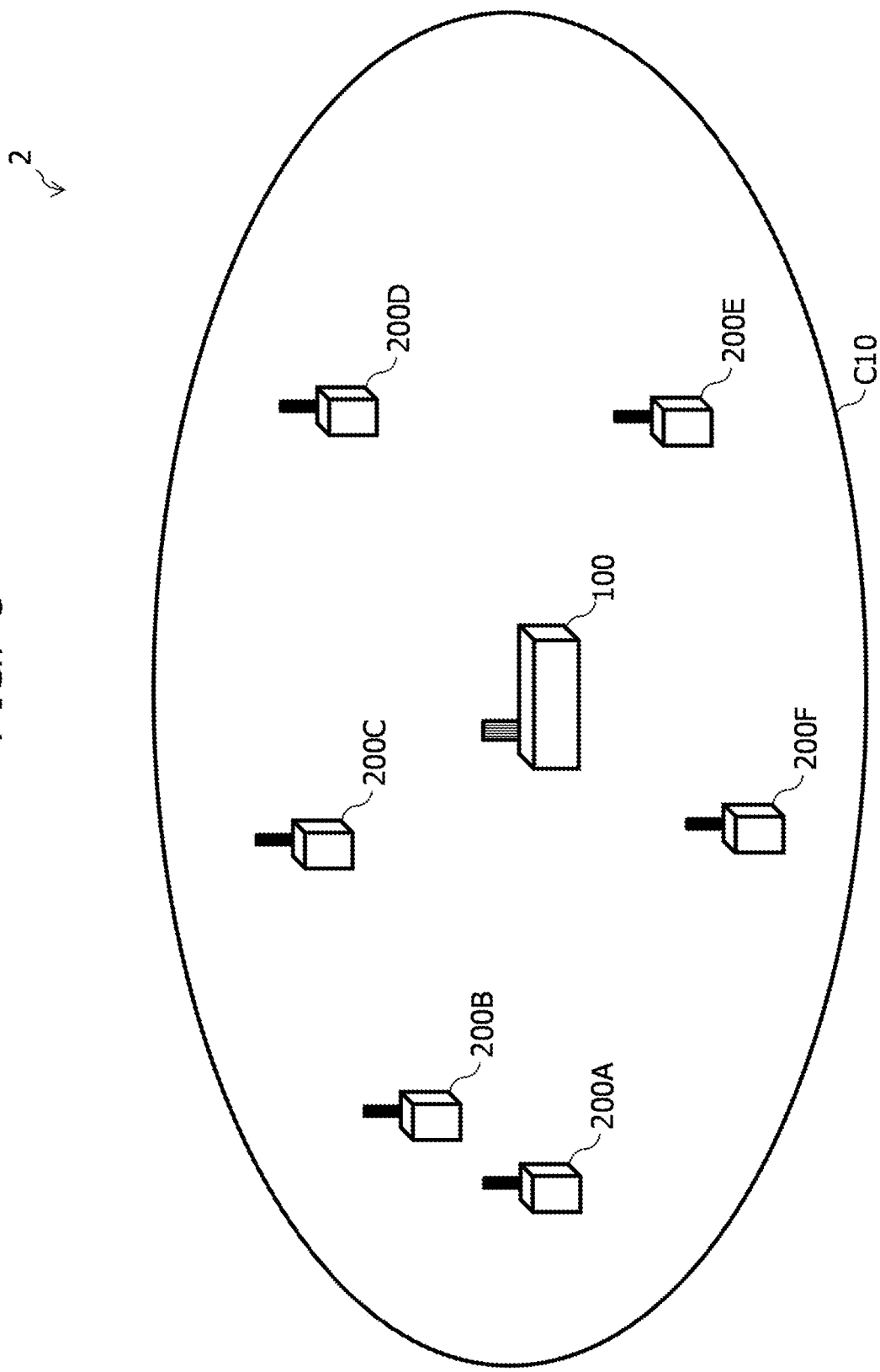
FIG. 5 is a diagram illustrating an exemplary network configuration according to a second embodiment.

FIG. 5 illustrates a wireless communication system 2 according to the second embodiment. The wireless communication system 2 includes a base station 100 and a plurality of terminals 200A to 200F. The base station 100 forms a cell C10. The plurality of terminals 200A to 200F is assumed to exist in the cell C10. Note that functions similar to those in the first embodiment are denoted by similar reference signs. Furthermore, each of the plurality of terminals 200A to 200F has a structure similar to that of the terminal 200 according to the first embodiment. Furthermore, in a case of not particularly distinguishing 200A to 200F, it is simply described as a terminal 200. Furthermore, although FIG. 5 illustrates an exemplary case where the number of the plurality of terminals 200 is six, it is not limited thereto.

In the second embodiment, the wireless communication system 2, the base station 100, and the terminal 200 have structures similar to those in the first embodiment, and thus descriptions thereof will be omitted.

Figure 6:
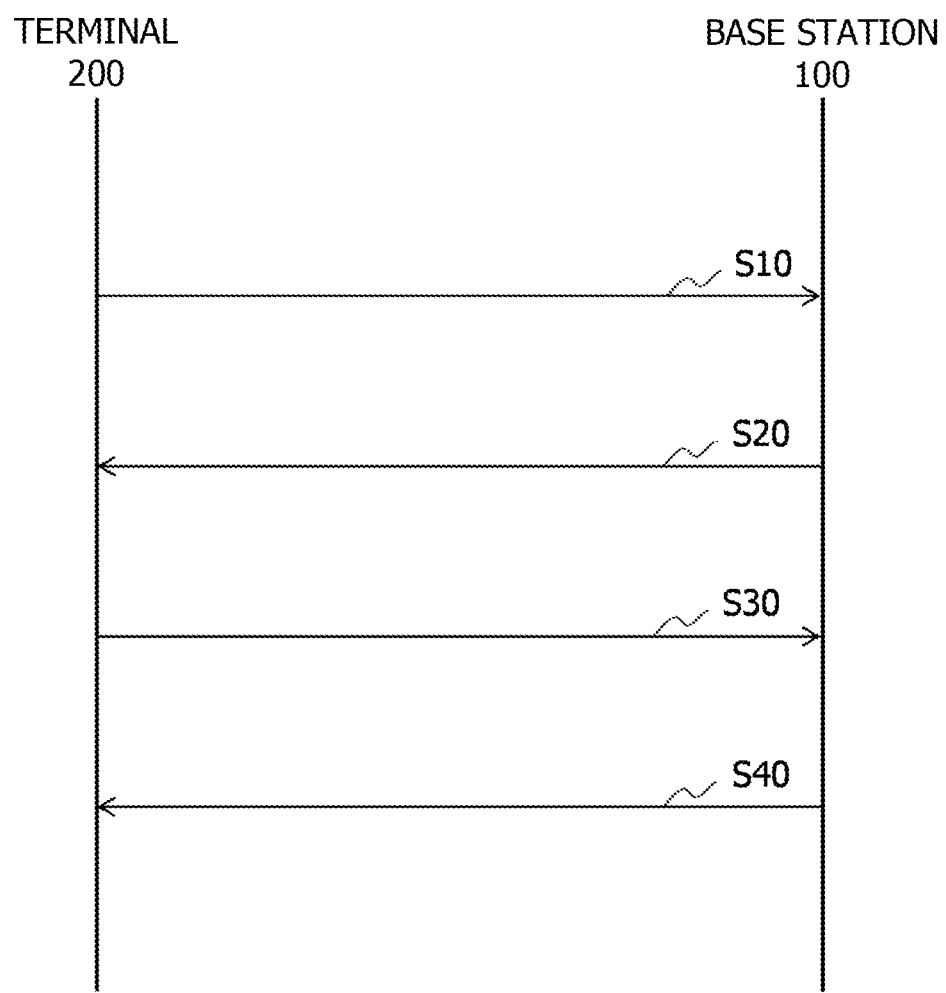
FIG. 6 is a diagram illustrating an exemplary random access procedure used in the second embodiment.

FIG. 6 is a diagram illustrating an exemplary sequence including a random access procedure in the wireless communication system 2 according to the second embodiment. FIG. 6 is a diagram illustrating a contention-based random access procedure to be used when, for example, uplink data signals are occurred in a state in which the base station 100 and the terminal 200 are out of synchronous (uplink out of synchronous state) or in a case of initial access.

A control unit 220 of the terminal 200 selects one preamble from a plurality of preambles allocated in advance. The transmission unit 211 transmits the selected preamble as a message 1 (or random access preamble (RAP)), and a reception unit 112 of the base station 100 receives the message 1 (S10). Hereinafter, the message 1 may be described as a RAP signal.

After receiving the message 1, a transmission unit 111 of the base station 100 transmits, as a message 2 (random access response (RAR)), synchronization signals for uplink communication, information associated with transmission permission, and the like, and the reception unit 212 of the terminal 200 receives the message 2 (S20). Hereinafter, the message 2 may be described as a random access response (RAR) signal. Note that, hereinafter, the RAR signal may be described as a MAC PDU RAR. Furthermore, a PDSCH is used at the time of transmitting a media access control protocol data unit random access response (MAC PDU RAR) of the message 2. In addition, a PDCCH associated with the PDSCH is also transmitted.

When the transmission/reception of the message 2 is successfully complete, the base station 100 and the terminal 200 transition from the uplink of out of synchronous state to the synchronous state.

The control unit 220 of the terminal 200 causes the terminal to transmit, to the base station, a message 3 (or scheduled transmission) including valid mobile station ID and the like at the transmission timing according to the information associated with the transmission timing (S30). Note that, when preamble collision occurs in the message 1, the control unit 120 of the base station 100 fails to decode the signals (message 3) and fails to perform reception, whereby it is enabled to recognize that the preamble collision has occurred. The transmission unit 111 of the base station 100 transmits, to the terminal, a message 4 (or contention resolution) including information regarding whether or not the message 3 has been successfully received (S40). Note that, when the base station has successfully received the message 3 in a contention-based random access procedure in a case where uplink data signals are generated, a valid identifier (ID) of the terminal is notified with the PDSCH. Note that, when the base station has failed to receive the message 3, the control unit 220 of the terminal 200 executes a non-adaptive hybrid automatic repeat request (HARQ).

Note that the base station 100 is capable of transmitting multiple RAR signals at the same timing. Therefore, at the time of decoding the message 2, the terminal 200 decodes the RAR signal corresponding to the identifier of the preamble transmitted in the message 1. Note that a MAC subheader in a MAC header is referred to at the time of identification.

FIG. 7 illustrates an exemplary operation flow of the wireless communication system 2 according to the second embodiment. FIG. 7 illustrates the RAR signal transmitted from the transmission unit 111 of the base station 100 using a resource 11 at t1. Note that resources 11A to 11F in the resource 11 indicate resources (i.e., MAC PDU RAR) storing information regarding the RAR signal corresponding to the terminals 200A to 200F, respectively. Note that the base station 100 is assumed to transmit the message 2 using the licensed band or the unlicensed band.

When the reception unit 212 of the terminal 200 receives the message 2 transmitted from the transmission unit 111 of the base station 100, the control unit 220 controls the transmission timing of the message 3 to be transmitted from the transmission unit 211 according to the information indicating the transmission timing.

Specifically, the control unit 220 performs control to transmit, according to the information indicating the transmission timing, the signals related to the random access procedure in the unlicensed band from the transmission unit 211 of each terminal 200 using resources 31A to 31F, which are transmission timings offset by a predetermined period of time from a resource 21 determined based on the configuration information (setting information). Note that, although the resource 21 is described to be at t5 after four subframes from the timing t1 at which the base station 100 has transmitted the message 2, it is not limited thereto, and for example, it may be changed according to a subcarrier spacing, changed based on allocation information from the base station, or changed based on the subcarrier spacing and the allocation information from the base station.

Furthermore, a different sub band (SB) of the unlicensed band is assumed to be allocated to each of the plurality of terminals 200. Note that, specifically, the unlicensed band is assumed to have a band of 20 mega, for example, and each 2 mega in the 20 mega is defined as a sub band. Note that the band (interval) of the sub band may be set to any value as long as it does not exceed the band of the unlicensed band.

FIG. 7 illustrates an exemplary case where the band of the unlicensed band is allocated to each terminal 200 not to overlap. Therefore, SB1 to SB6 are different bands.

Furthermore, FIG. 7 illustrates an exemplary case where the respective terminals 200 transmit the message 3 at the transmission timing corresponding to the information (TX (X is an integer)) associated with respective transmission timings.

Specifically, the terminal 200A transmits the message 3 to the base station 100 using the resource 31A at the transmission timing of t9 offset by the time of T1 from the transmission timing of t5. Furthermore, the terminal 200B transmits the message 3 to the base station 100 using the resource 31B at the transmission timing of t8 offset by the time of T2 from the transmission timing of t5. Furthermore, the terminal 200C transmits the message 3 to the base station 100 using the resource 31C at the transmission timing of t7 offset by the time of T3 from the transmission timing of t5. Furthermore, the terminal 200D transmits the message 3 to the base station 100 using the resource 31D at the transmission timing of t6 offset by the time of T4 from the transmission timing of t5. Furthermore, the terminal 200E transmits the message 3 to the base station 100 using the resource 31E at the transmission timing of t9 offset by the time of T5 from the transmission timing of t5. Furthermore, the terminal 200F transmits the message 3 to the base station 100 using the resource 31C at the transmission timing of t5 without being offset from the transmission timing of t5 (i.e., offset information indicates zero).

As a result, for example, while the random access procedure may fail in all the terminals 200A to 200F in a case where another wireless communication system is transmitting signals with the resource 21 at the timing of t5, the terminal 200 transmits the message 3 according to the information associated with the transmission timing, and thus only the terminal 200F may fail to proceed with the random access procedure.

Therefore, it is only the terminal 200F that may perform the random access procedure again. In other words, the terminals 200A to 200E are not affected by the signals transmitted by the another wireless communication system with the resource 21, thereby increasing the success rate of the random access procedure.

Furthermore, when the another wireless communication system communicates using a band within the unlicensed band including SB1 to SB6, it senses the unlicensed band and transmits signals in a case of being idle. When the another wireless communication system attempts to transmit signals at the timing of t7, it is highly likely that busy determination is made at t5 and t6, which are the timings at which the terminal 200F and the terminal 200D are transmitting the message 3, respectively. Therefore, in a case of not being affected by the another wireless communication system at t5, it is unlikely to be affected by the another wireless communication system even at later timings.

Therefore, the success rate of the wireless communication system 2 as a whole is improved.

Here, a specific example of the information associated with the transmission timing will be described. The information associated with the transmission timing is, for example, configuration information corresponding to at least one of predetermined configuration information or information included in configuration information notified from the base station 100 to the terminal 200.

A first example is an example of using the predetermined configuration information. For the predetermined configuration information, for example, the maximum value Y of the offset value of the transmission timing is set at the time of implementation. Note that the configuration information is stored in a storage unit 230 of the terminal 200. Note that the maximum value Y may be changed according to a value (A) that defines a subcarrier spacing. For example, the maximum value Y may be set larger as the value (A) that defines the subcarrier spacing increases, and conversely, the maximum value Y may be set smaller as the value (A) that defines the subcarrier spacing increases.

Then, the control unit 220 uses the offset value selected in the range of 0 to Y as information associated with the transmission timing, and controls the timing of transmitting the message 3. Note that examples of a selection method of the control unit 220 include a method in which the control unit 220 performs selection randomly and a method of selection using different values for each terminal 200 such as an identifier of the terminal 200 or a preamble identifier. Note that, for example, the identifier of the terminal 200 is divided by the maximum value Y, and the remainder value is set as the information associated with the transmission timing (offset value), as the method of using the identifier of the terminal 200, for example. Similarly, for example, the preamble identifier is divided by the maximum value Y, and the remainder value is set as the information associated with the transmission timing (offset value), as the method of using the preamble identifier.

A second example is an example in which the base station 100 notifies the terminal 200 of the information associated with the transmission timing. As a method of making notification about the offset information, a master information block (MIB), a system information block (SIB) such as a system information block type 1 (SIB1) and a system information block type 2 (SIB2), and the like are used as notification information to make notification. Furthermore, an RRC message (e.g., RRC reconfiguration message, RRC setup message, etc.) is used to notify each terminal individually. Furthermore, the PDCCH that associates with the transmission of the MAC PDU RAR is used to notify the terminal 200.

Then, the control unit 220 controls the transmission timing of the message 3 according to the notified information associated with the transmission timing.

Note that, in the case of making notification with the notification information, for example, there are a method of making notification of a specific value, a method of making notification of a plurality of values, and a method of making notification of a maximum value as described in the first example. In addition, when the notification regarding the plurality of values or the maximum value has been made, in a similar manner to the first example, there are a method in which the control unit 220 performs selection randomly and a method of selection using different values for each terminal 200 such as an identifier of the terminal 200 or a preamble identifier.

According to a third example, the base station 100 notifies the terminal 200 of the information associated with the transmission timing in a manner of being included in the message of the random access procedure. This will be specifically described with reference to FIGS. 8A to 8B. FIG. 8A illustrates a first example of concatenating and transmitting media access control protocol data units (MAC PDUs) of a plurality of RAR signals. Note that, for example, MAC subheaders 12A to 12F correspond to RAR signals 11A (MAC RAR 1) to 11F (MAC RAR 6), respectively. Furthermore, the reference signs same as those in FIG. 7 have the meanings same as those in FIG. 7. Furthermore, although an SDU (PDU) to be padding is not illustrated in FIGS. 8A to 8B, it may be added as needed.

In the case of the configuration of FIG. 8A, offset information is given to each of the MAC subheaders 12A to 12F or the information associated with the transmission timing is given to each of the RAR signals 11A to 11F for transmission. Note that the information associated with the transmission timing indicates the maximum value that can be offset or the offset value. Note that, in the case of the maximum value, it is selected by the method described in the first example.

Then, the terminal 200 controls the transmission timing based on the information associated with the transmission timing received by the control unit 220.

FIG. 8B illustrates a second example of concatenating and transmitting media access control protocol data units (MAC PDUs) of a plurality of RAR signals.

In FIG. 8B, a MAC PDU Delay is defined as a new MAC PDU. Note that the MAC PDU Delay is a tentative name that may be defined by any wording, and for example, it may be described as a MAC PDU Offset. Note that, although FIG. 8B does not illustrate a MAC subheader for the MAC PDU Delay, the MAC subheader for the MAC PDU Delay may be added in the MAC header.

Figure 9:
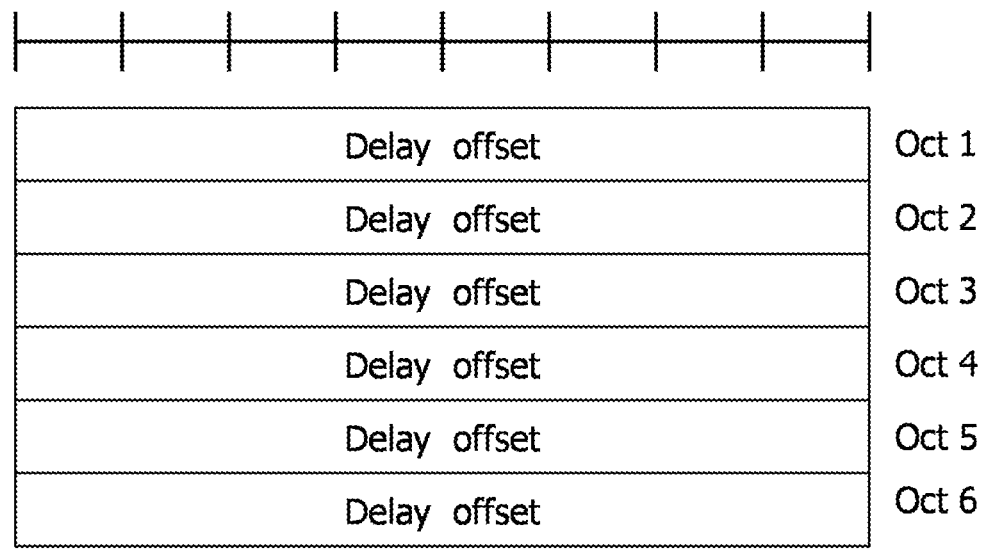
FIG. 9 is a diagram illustrating exemplary MAC PDU configuration of a MAC PDU Delay.

FIG. 9 illustrates an exemplary configuration of the MAC PDU Delay. Oct 1 in FIG. 9 corresponds to the terminal 200A, and hereinafter, Oct 2 corresponds to the terminal 200B, Oct 3 corresponds to the terminal 200C, Oct 4 corresponds to the terminal 200D, Oct 5 corresponds to the terminal 200E, and Oct 6 corresponds to the terminal 200F. In short, the structures in the MAC PDU Delay are to be correspond to the PDUs following the MAC PDU Delay in order from the top. Note that the number of bits of the Delay offset may be reduced, and several bits may be used to indicate any of the RAR signals 11A to 11F. Furthermore, for example, 4 bits are used for the MAC PDU Delay, and 4 bits are used to indicate any of the RAR signals 11A to 11F. Furthermore, in order to make the information indicating any of the RAR signals 11A to 11F correspond to the preamble identifier of the MAC subheader, several bits out of six Octs, which is the same number of bits for the preamble identifier of the MAC subheader, may indicate any of the RAR signals 11A to 11F, and the remaining number of bits may be set as the Delay offset.

In this manner, the MAC RAR below the MAC PDU Delay is notified collectively.

Figure 10:
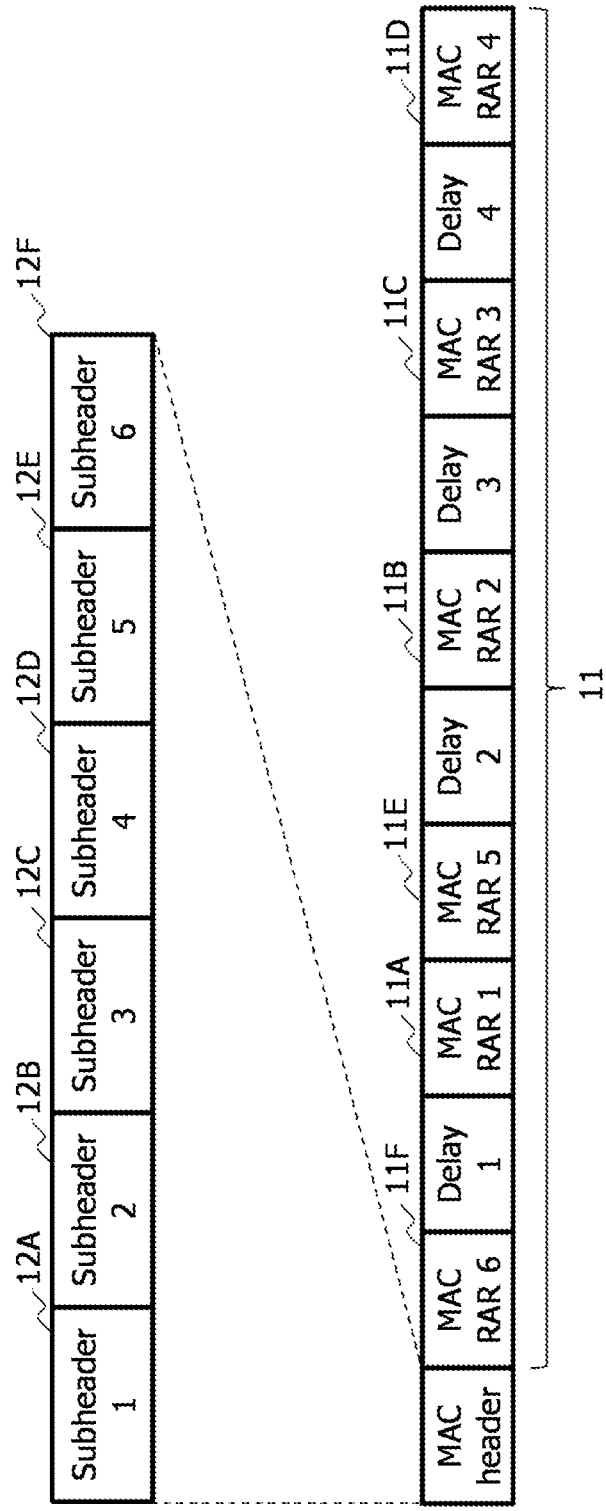
FIG. 10 is a diagram illustrating exemplary concatenation of MAC PDUs according to the second embodiment.

Furthermore, FIG. 10 illustrates a third example of concatenating and transmitting media access control protocol data units (MAC PDUs) of a plurality of RAR signals.

In FIG. 10, a MAC PDU Delay is defined as a new MAC PDU in a similar manner to FIG. 8B. Note that, although FIG. 10 also does not illustrate a MAC subheader for the MAC PDU Delay in a similar manner to FIG. 8B, the MAC subheader for the MAC PDU Delay may be added in the MAC header.

The example of FIG. 10 is a method of making notification of the same offset amount collectively. In other words, it is a method of making notification for a certain RAR as common information. In FIG. 10, the transmission timing is not changed according to the information associated with the transmission timing in the terminal 200F illustrated in FIG. 7. For example, the information associated with the transmission timing indicates the original position. Therefore, it is placed before the MAC PDU Delay 1.

Furthermore, the terminals 200A and 200E illustrated in FIG. 7 are changed from t5 to t9 according to the information associated with the transmission timing. Therefore, the terminals 200A and 200E, which transmit the information associated with the transmission timing with the MAC PDU Delay 1 and transmit the message 3 in response to the RAR signals 11A and 11E following the MAC PDU Delay 1, transmit the message 3 at the position corresponding to the information associated with the transmission timing indicated by the MAC PDU Delay 1.

Furthermore, the terminal 200B illustrated in FIG. 7 is changed from t5 to t8 according to the information associated with the transmission timing. Therefore, the terminal 200, which transmits the information associated with the transmission timing with the MAC PDU Delay 2 and transmit the message 3 in response to the RAR signal 11B following the MAC PDU Delay 2, transmits the message 3 at the position corresponding to the information associated with the transmission timing indicated by the MAC PDU Delay 2.

Furthermore, the terminal 200C illustrated in FIG. 7 is changed from t5 to t7 according to the information associated with the transmission timing. Accordingly, the transmission unit 111 of the base station 100 transmits the information associated with the transmission timing with the MAC PDU Delay 3. The terminal 200C, which transmits the message 3 in response to the RAR signal 11C following the MAC PDU Delay 3, transmits the message 3 at the timing corresponding to the information associated with the transmission timing indicated by the MAC PDU Delay 3.

Furthermore, the terminal 200D illustrated in FIG. 7 is changed from t5 to t6 according to the information associated with the transmission timing. Accordingly, the transmission unit 111 of the base station 100 transmits the information associated with the transmission timing with the MAC PDU Delay 4. The terminal 200D, which transmits the message 3 in response to the RAR signal 11D following the MAC PDU Delay 4, transmits the message 3 at the timing corresponding to the information associated with the transmission timing indicated by the MAC PDU Delay 4.

In this manner, the terminal 200 is capable of controlling the transmission timing of the message 3 according to the MAC PDU Delay before the RAR signal addressed to its own terminal 200 (header side) among the concatenated media access control protocol data units (MAC PDUs) of a plurality of RAR signals.

Furthermore, the structure of the MAC PDU Delay is defined as Delay Offset between 1 to 8 bits as 1 Oct, for example.

Note that the second embodiment is described on the premise that carrier sensing is not performed before the message 3 is transmitted.

Note that, while various examples have been described as methods of making notification about the information associated with the transmission timing, these may be used in combination as appropriate. For example, the maximum value Y may be notified using the notification information, the value notified by the MAC PDU Delay may be divided by the maximum value Y, and the transmission timing may be controlled according to the remainder value. Furthermore, the RAR signal addressed to the terminal 200 with no change in the transmission timing is placed before the MAC PDU Delay, and the RAR signal addressed to the terminal 200 with a change in the transmission timing is placed after the MAC PDU Delay. Then, the transmission timing may be controlled as described with reference to FIGS. 8A to 9.

The second embodiment has been described above. As is clear from the descriptions above, according to the wireless communication system 2 of the present embodiment, it becomes possible to efficiently perform the random access procedure in the case where the terminal 200 transmits the message 3 using the unlicensed band. Furthermore, the possibility that a plurality of terminals 200 fail to proceed with the random access procedure at the same timing decreases. Therefore, the random access procedure using the unlicensed band in the entire wireless communication system 2 becomes efficient.

Third Embodiment

In the first embodiment, an exemplary case of performing control in such a manner that the transmission timing of the signals of the random access procedure transmitted from the terminal 200 is changed according to the information associated with the transmission timing has been described.

Furthermore, in the second embodiment, an exemplary case of presenting the transmission timing of the message 3 in the terminal random access procedure has been described. In a third embodiment, an exemplary case where a terminal 200 continuously transmits a message 3 will be further described. Note that, in the third embodiment, a wireless communication system, a base station, and a terminal are similar to those in the second embodiment, and thus descriptions thereof will be omitted.

Signals to be transmitted from the terminal 200 using an unlicensed band may be instructed to be repeatedly transmitted by control signals (or control channel (physical downlink control channel: PDCCH)) transmitted from a base station 100.

Accordingly, the number of repeated transmissions of the message 3 is also controlled based on information from the base station 100.

Figure 11:
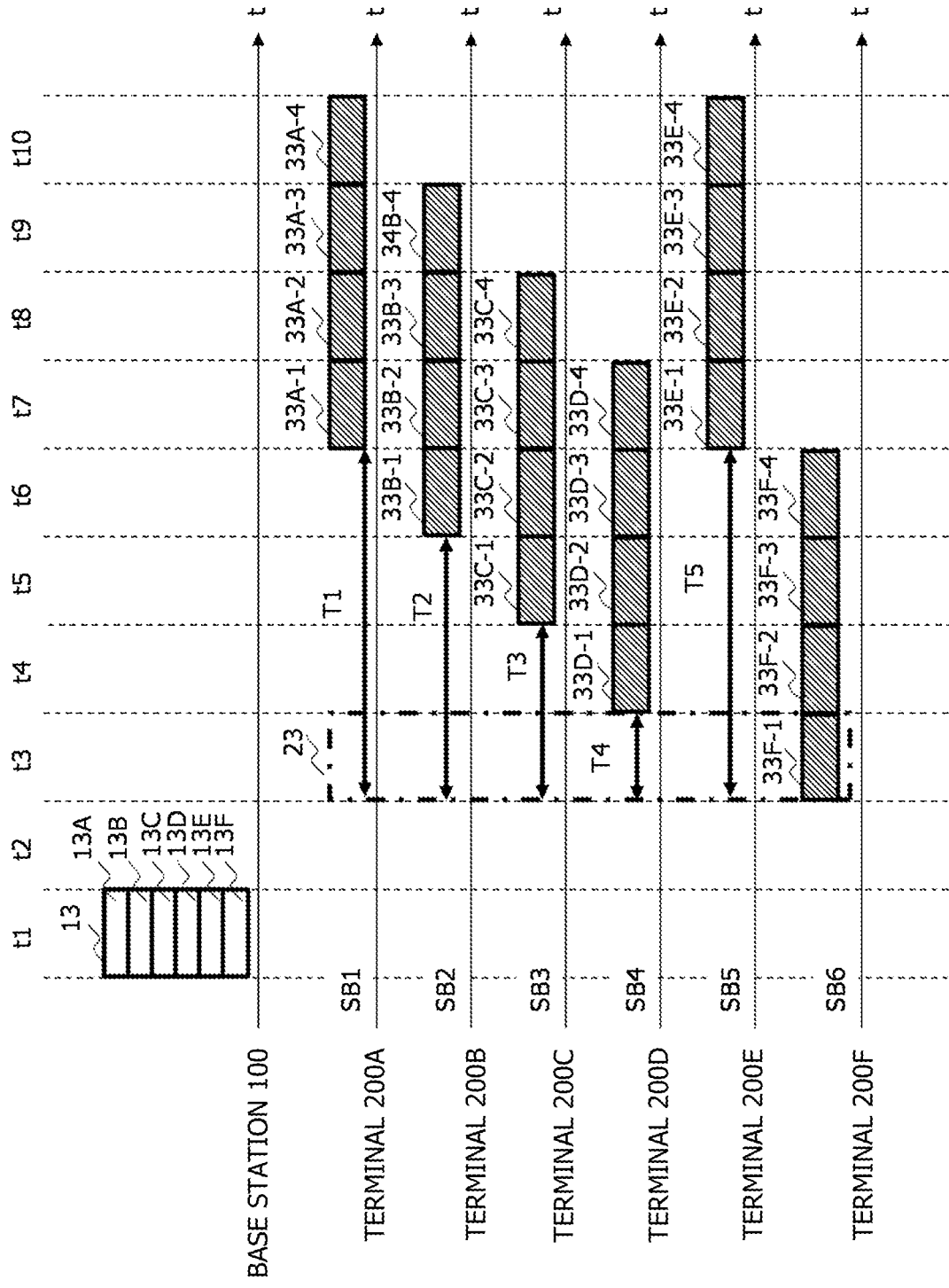
FIG. 11 is a diagram illustrating an exemplary operation flow of a wireless communication system according to a third embodiment.

FIG. 11 illustrates an exemplary operation flow of a wireless communication system 2 according to the third embodiment. FIG. 11 illustrates a RAR signal transmitted from a transmission unit 111 of the base station 100 using a resource 13 at t1. Note that resources 13A to 13F in the resource 13 indicate resources storing information regarding the RAR signal (i.e., MAC PDU RAR) corresponding to terminals 200A to 200F, respectively. Furthermore, the resource 13 is information to be transmitted using a physical downlink channel (PDSCH).

Note that, although not illustrated in FIG. 11, a PDCCH accompanies to indicate information of the resource of the PDSCH and the like at the time of transmitting the PDSCH.

FIG. 11 is an example of controlling the number of repeated signal transmissions of the message 3 using the PDCCH. Note that the PDCCH is notified using, for example, DCI format OC or DCI format 1_0.

In FIG. 11, any method described in the second embodiment may be used for information associated with a first transmission timing of each terminal 200, and thus descriptions thereof will be omitted here.

Furthermore, in FIG. 11, initial timings at which the respective terminals 200 transmit a message are resources 33A-1 to 33F-1, which are transmission timings offset by a predetermined period of time from a resource 23 determined on the basis of setting information.

Then, a control unit 220 of the terminal 200 continuously transmits the message 3 based on the information regarding the number of repeated transmissions stored in the PDCCH. For example, the terminal 200A transmits the message 3 with the resource 33A-1 at the timing of t7, and also transmits the message 3 with subsequent resources 33A-2, 33A-3, and 33A-4. Similarly, the terminal 200B transmits the message 3 with the resource 33B-1 at the timing of t6, and also transmits the message 3 with subsequent resources 33B-2, 33B-3, and 33B-4. The terminal 200C transmits the message 3 with the resource 33C-1 at the timing of t5, and also transmits the message 3 with subsequent resources 33C-2, 33C-3, and 33C-4. The terminal 200D transmits the message 3 with the resource 33D-1 at the timing of t4, and also transmits the message 3 with subsequent resources 33D-2, 33D-3, and 33D-4. The terminal 200E transmits the message 3 with the resource 33E-1 at the timing of t7, and also transmits the message 3 with subsequent resources 33E-2, 33E-3, and 33E-4. The terminal 200F transmits the message 3 with the resource 33F-1 at the timing of t3, and also transmits the message 3 with subsequent resources 33F-2, 33F-3, and 33F-4.

Furthermore, information for instructing the number of continuous transmissions may be stored in an RAR signal 13 to be a message 2. For example, in addition to the information associated with the transmission timing (Delay offset), the information indicating the number of repeated transmissions may be included in the MAC PDU Delay described in the second embodiment.

With the repeated transmission of the message 3 transmitted from the terminal 200 made available, the success rate of the random access procedure of each terminal 200 increases. For example, even when another wireless communication system uses the unlicensed band from the transmission timings t2 to t5, the influence of the another system decreases in transmission from t6 onward, thereby increasing the probability of success.

Note that the third embodiment is described on the premise that carrier sensing is not performed before the message 3 is transmitted.

Note that, while FIG. 11 is described based on the example in which the number of repeated transmissions is four, the number of repeated transmissions is not limited.

The third embodiment has been described above. As is clear from the descriptions above, according to the wireless communication system 2 of the present embodiment, it becomes possible to efficiently perform the random access procedure in the case where the terminal 200 transmits the message 3 using the unlicensed band. Furthermore, it is possible to control the number of repeated transmissions, which makes it possible to further increase the success rate of the random access procedure.

Fourth Embodiment

In the first embodiment, an exemplary case of performing control in such a manner that the transmission timing of the signals of the random access procedure transmitted from the terminal 200 is changed according to the information associated with the transmission timing has been described. Furthermore, in the second embodiment, an exemplary case of presenting the transmission timing of the message 3 in the terminal random access procedure has been described. Furthermore, in the third embodiment, an embodiment of continuously transmitting the message 3 has been described. In a fourth embodiment, an embodiment of controlling an interval for continuously transmitting a message 3 will be described. Note that, in the fourth embodiment, a wireless communication system, a base station, and a terminal are similar to those in the second and third embodiments, and thus descriptions thereof will be omitted.

FIG. 12 illustrates an exemplary operation flow of a wireless communication system 2 according to the fourth embodiment. FIG. 12 illustrates a RAR signal transmitted from a transmission unit 111 of a base station 100 using a resource 14 at t1. Note that resources 14A to 14F in the resource 14 indicate resources storing information regarding the RAR signal corresponding to terminals 200A to 200F, respectively. Furthermore, the resource 14 is information to be transmitted via a physical downlink channel (PDSCH).

Note that, although not illustrated in FIG. 12, a PDCCH accompanies to indicate information of the resource of the PDSCH and the like at the time of transmitting the PDSCH.

In the fourth embodiment, information up to the transmission timing at which the message 3 is first transmitted is described as offset information 1 (TX-1 (X is an integer)) in FIG. 12. Furthermore, information associated with an interval between messages to be subject to continuous transmission is described as offset information 2 (TX-2 (X is an integer)). Note that the offset information 1 and the offset information 2 may be collectively described as information associated with the transmission timing or configuration information.

Furthermore, the method described in the second embodiment may be applied as a notification method of the offset information 1 and offset information 2, and thus descriptions thereof will be omitted. In short, for example, in a case of making notification using notification information, information associated with the offset information 1 and offset information 2 is included in the notification information and transmitted. However, in a case of performing control using a MAC PDU Delay, different MAC PDU formats may be defined. The MAC PDU format will be described later. Note that, in a case of making notification about the maximum value, the maximum value may be different between the offset information 1 and the offset information 2. Furthermore, in a case of setting a plurality of values, different values or the number of different values may be set in the offset information 1 and offset information 2. Furthermore, for example, the offset information 1 and the offset information 2 may be associated with each other. For example, it may be defined by a remainder obtained by dividing the offset information 1 by a predetermined value or by an integer obtained by incrementing or decrementing a value obtained by dividing the offset information 1 by a predetermined value. In short, the offset information 1 and the offset information 2 may be optionally set individually, or may have a certain relationship with each other. Furthermore, the offset information 1 and the offset information 2 may be used as the same offset information as common information (i.e., one common offset information).

Furthermore, in FIG. 12, initial timings at which the respective terminals 200 transmit the message 3 are resources 34A-1 to 34F-1, which are transmission timings offset by a predetermined period of time according to the offset information 1 from a resource 24 determined on the basis of the configuration information (setting information). Furthermore, the timings of continuous transmission are resources 34A-2 to 34F-2, which are transmission timings offset by a predetermined period of time according to the offset information 2 from the resources 34A-1 to 34F-1, which are immediately preceding transmission timings.

In short, a control unit 220 of each terminal 200 transmits the message 3 (multiple times) according to the number of repeated transmissions, the offset information 1, and the offset information 2. For example, the terminal 200A transmits the message 3 with the resource 34A-1 at the timing of t6, and then transmits the message 3 with the resource 34A-2 at the timing of t8. Similarly, the terminal 200B transmits the message 3 with the resource 34B-1 at the timing of t6, and then transmits the message 3 with the resource 34B-2 at the timing of t7. The terminal 200C transmits the message 3 with the resource 34C-1 at the timing of t4, and then transmits the message 3 with the resource 34C-2 at the timing of t6. The terminal 200D transmits the message 3 with the resource 34D-1 at the timing of t4, and then transmits the message 3 with the resource 34D-2 at the timing of t6. The terminal 200E transmits the message 3 with the resource 34E-1 at the timing of t5, and then transmits the message 3 with the resource 34E-2 at the timing of t8. The terminal 200F transmits the message 3 with the resource 34F-1 at the timing of t3, and then transmits the message 3 with the resource 34F-2 at the timing of t5.

Here, the structure of the MAC PDU Delay that collectively makes notification about the offset information 1 and the offset information 2 will be described.

FIGS. 13A and 13B are exemplary structures of the MAC PDU Delay that collectively makes notification about the offset information 1 and the offset information 2. In FIGS. 13A and 13B, the offset information 1 corresponds to the delay offset 1, and the offset information 2 corresponds to the delay offset 2. Furthermore, a repetition number in FIG. 13B represents information indicating the number of repeated transmissions.

FIG. 13A is an example in which each of the offset information 1 and the offset information 2 has 4 bits. In this case, the number of repeated transmissions is included in, for example, a PDCCH that accompanies at the time of transmitting a RAR signal 14.

A case of FIG. 13A will be described. For example, in a case where the offset information 1 indicates "0000", it is the timing of first transmitting the message 3 to the resource 24 determined according to the setting information (e.g., corresponding to the terminal 200F in FIG. 12). Furthermore, in a case where the offset information 1 indicates "0001", it is the timing of first transmitting the message 3 with the resource separated by one predetermined interval from the resource 24 determined according to the setting information (e.g., corresponding to the terminals 200C and 200D in FIG. 12). Furthermore, in a case where the offset information 1 indicates "0010", it is the timing of first transmitting the message 3 with the resource separated by two predetermined intervals from the resource 24 determined according to the setting information (e.g., corresponding to the terminal 200E in FIG. 12).

In this manner, it becomes possible to control the timing of first performing transmission according to the offset information 1.

Furthermore, for example, in a case where the offset information 2 indicates "0000", the message 3 to be subject to continuous transmission is transmitted at the timing following the timing of immediately preceding transmission of the message 3 (e.g., corresponding to the terminal 200B in FIG. 12). Furthermore, in a case where the offset information 2 indicates "0001", the message 3 to be subject to continuous transmission is transmitted with the resource separated by one predetermined interval from the timing of immediately preceding transmission of the message 3 (e.g., corresponding to the terminals 200A, 200C, 200D, and 200F in FIG. 12). Furthermore, in a case where the offset information 3 indicates "0010", the message 3 to be subject to continuous transmission is transmitted with the resource separated by two predetermined intervals from the timing of immediately preceding transmission of the message 3 (e.g., corresponding to the terminal 200E in FIG. 12).

In this manner, it becomes possible to control the interval at the time of performing continuous transmission according to the offset information 2.

Note that the predetermined interval described above may be any interval as long as it indicates an interval defined by a time axis of, for example, a slot, a mini-slot, a subframe, or the like.

Next, a case of FIG. 13B will be described. Note that the offset information 1 and the offset information 2 differ from those in FIG. 13A only in the number of bits. In short, the number of intervals that can be offset is different. For example, in a case where the number of repeated transmissions indicate "00", the number of transmissions is set to one. In short, transmission is performed only at the initial transmission timing. Furthermore, in a case of indicating "01", the number of transmissions is set to two. In short, one repeated transmission is performed in addition to the initial transmission timing (e.g., corresponding to each terminal 200 in FIG. 12). Furthermore, in a case of indicating "10", the number of transmissions is set to three. In short, two repeated transmissions are performed in addition to the initial transmission timing (e.g., corresponding to each terminal 200 in FIG. 12). Furthermore, in a case of indicating "11", the number of transmissions is set to four. In short, three repeated transmissions are performed in addition to the initial transmission timing (e.g., corresponding to each terminal 200 in FIG. 12).

In this manner, it becomes possible to perform control of transmitting the message 3 depending on the number of repeated transmissions.

Note that it is needless to say that the MAC PDU Delay defined in FIGS. 13A and 13B may be used by applying it in the MAC PDU Delay illustrated in FIGS. 8B and 10. Furthermore, the content of each Oct illustrated in FIG. 9 may be changed to the content of Oct 1 illustrated in FIG. 13A or FIG. 13B.

Note that the offset information 1 and the offset information 2 are the maximum value that can be offset or the offset value. Note that the method described in the second embodiment is used in the case of the maximum value, for example.

As described in other embodiments as well, when another wireless communication system communicates in the unlicensed band, carrier sensing is performed for the unlicensed band. However, in the fourth embodiment, any of the terminals 200 transmits the message 3 during the period from t3 to t8. In other words, between t3 and t8, it is unlikely that another wireless communication system newly uses the unlicensed band. Therefore, in addition to making the random access procedure efficient in the entire wireless communication system, it is also possible to suppress the number of continuous transmissions of the terminal 200, which makes it possible to reduce the power consumption of the terminal 200.

The fourth embodiment has been described above. As is clear from the descriptions above, according to the wireless communication system 2 of the present embodiment, it becomes possible to efficiently perform the random access procedure in the case where the terminal 200 transmits the message 3 using the unlicensed band. Furthermore, it becomes possible to control the number of repeated transmissions and the interval thereof so that the success rate of the random access procedure is increased, which makes it possible to perform the random access procedure efficiently in a case where the terminal 200 transmits the message 3 using the unlicensed band.

Fifth Embodiment

In the first embodiment, an exemplary case of performing control in such a manner that the transmission timing of the signals of the random access procedure transmitted from the terminal 200 is changed according to the information associated with the transmission timing has been described. Furthermore, the second to fourth embodiments have been described on the basis of the message 3 of the random access procedure. In a fifth embodiment, a case of adapting to a message 1, which is a signal of a random access procedure, will be described. Note that, in the fifth embodiment, a wireless communication system, a base station, and a terminal are similar to those in the second to fourth embodiments, and thus descriptions thereof will be omitted.

At the time of adapting to the message 1, a method other than that of receiving information associated with a transmission timing via a message 2 and the like, which has been described in the second to fourth embodiments, may be adapted. In short, for example, configuration information is set using notification information, and transmission of the message 1 is controlled according to the configuration information.

The fifth embodiment has been described above. As is clear from the descriptions above, according to a wireless communication system 2 of the present embodiment, it becomes possible to efficiently perform the random access procedure in the case where the terminal 200 transmits the message 1 using the unlicensed band.

Sixth Embodiment

In the first embodiment, an exemplary case of performing control in such a manner that the transmission timing of the signals of the random access procedure transmitted from the terminal 200 is changed according to the information associated with the transmission timing has been described. Furthermore, an example of selecting a frequency has also been described as a modified example thereof. Furthermore, an example of controlling the transmission timing of the message of the random access procedure to be transmitted by the terminal 200 has been described in the second to fifth embodiments. In a sixth embodiment, a specific method for selecting a frequency will be described. Note that, in the sixth embodiment, a wireless communication system, a base station, and a terminal are similar to those in the first embodiment, and thus descriptions thereof will be omitted.

FIG. 14 illustrates an exemplary operation flow of a wireless communication system 1 according to the sixth embodiment. FIG. 14 illustrates a signal of a random access procedure transmitted from a transmission unit 111 of a base station 100 using a resource 15 at t1. Furthermore, the resource 15 is information to be transmitted via a physical downlink channel (PDSCH).

When a terminal 200 receives the signal of the random access procedure transmitted with the resource 15, it performs carrier sensing (or LBT) on a region 45 of an unlicensed band UB allocated in advance. Depending on the result of the carrier sensing (or LBT), a control unit 220 of the terminal 200 selects a resource 35 corresponding to the frequency needed for the terminal 200 to carry out transmission (e.g., frequency corresponding to the sub band in the second embodiment) in the unlicensed band UB. Specifically, explaining with the exemplary case where the unlicensed UB is 10 mega and the sub band needed for transmission is 2 M, when the idle region in the unlicensed UB of 10 mega is 6 mega, the control unit 220 selects 2 mega needed for transmission from this 6 mega and performs transmission.

With the arrangement as described above, it becomes possible to select an empty region from a plurality of candidates, which lowers the probability that transmission is not performed. Accordingly, the random access procedure using the unlicensed band becomes efficient.

Here, a specific notification method for the unlicensed band UB will be described.

A first example of the notification method is an example in which the base station 100 notifies the terminal 200 of the information associated with the transmission timing. As a method of making notification about the offset information, a master information block (MIB), a system information block (SIB) such as a system information block type 1 (SIB1) and a system information block type 2 (SIB2), and the like are used as notification information to make notification. Furthermore, an RRC message (e.g., RRC reconfiguration message, RRC setup message, etc.) is used to notify each terminal individually.

As a second example, the terminal 200 is notified with the PDCCH that accompanies at the time of transmitting a MAC PDU RAR in a case where the message 2 is transmitted with the resource 15.

As a third example, a new PDU or configuration information in the PDU is defined and notification about frequency offset information is made. Specifically, for example, the allocated unlicensed band is notified of information indicating ±X mega. For example, control is performed in such a manner that notification about a band of the unlicensed band of 2 mega is made with the PUCCH and carrier sensing (LBT) is performed at ±X mega according to the new PDU or configuration information in PDU, which is newly defined.

Note that, in a case of concatenating PDUs, concatenation may be carried out as in the PDU Delay described in the second embodiment.

The sixth embodiment has been described above. As is clear from the descriptions above, according to the wireless communication system 1 of the present embodiment, it becomes possible to efficiently perform the random access procedure in the case where the terminal 200 transmits the signal of the random access procedure using the unlicensed band.

In the second to fifth embodiments, an example of making it possible to change the transmission timing of the signals of the random access procedure to be transmitted from the terminal 200 to the base station 100 has been described. Furthermore, an example of selecting and transmitting on the frequency axis has been described in the sixth embodiment. However, the present embodiment is not limited thereto, and for example, the second to sixth embodiments may be used in combination. In short, it may be adjusted on both the frequency axis and the time axis. With such an arrangement, the random access procedure using the unlicensed band becomes more efficient. Note that the methods described in the respective embodiments are used for the notification method of respective pieces of information. Furthermore, in a case of making notification using the same method, they may be transmitted collectively in one signal.

Furthermore, although descriptions based on the contention-based random access procedure have been given in the second to fifth embodiments, a non-contention-based random access procedure may proceed in a similar manner. Furthermore, in a case of adapting to a message 1 with the non-contention-based random access procedure, the base station 100 may use the MAC PDU Delay described in the second to fourth embodiments at the time of transmitting a message 0.

Furthermore, the control unit 220 may control the transmission timing of both the message 1 and the message 3 using the methods described in the first to sixth embodiments to control the transmission timing, the unlicensed frequency to be transmitted, and the like.

Furthermore, at the time of transmitting the signals of the random access procedure from the base station 100 to the terminal 200, the base station 100 according to the first to sixth embodiments is set to a licensed band. In short, LAA is used.

Furthermore, at the time of transmitting the signals of the random access procedure from the base station 100 to the terminal 200, the base station 100 according to the first to sixth embodiments may be set to an unlicensed band.

Furthermore, control may be performed in such a manner that notification of the maximum value of the number of continuous transmissions (number of transmissions) of the signals of the random access procedure described in the third and fourth embodiments and the like is made, and the control unit 220 of the terminal 200 makes a selection between zero and the maximum value.

[Hardware Structure of Each Device in Wireless Communication System of Respective Embodiments]

A hardware structure of each device in a wireless communication system according to the respective embodiments and variations will be described on the basis of FIGS. 15 and 16.

Figure 15:
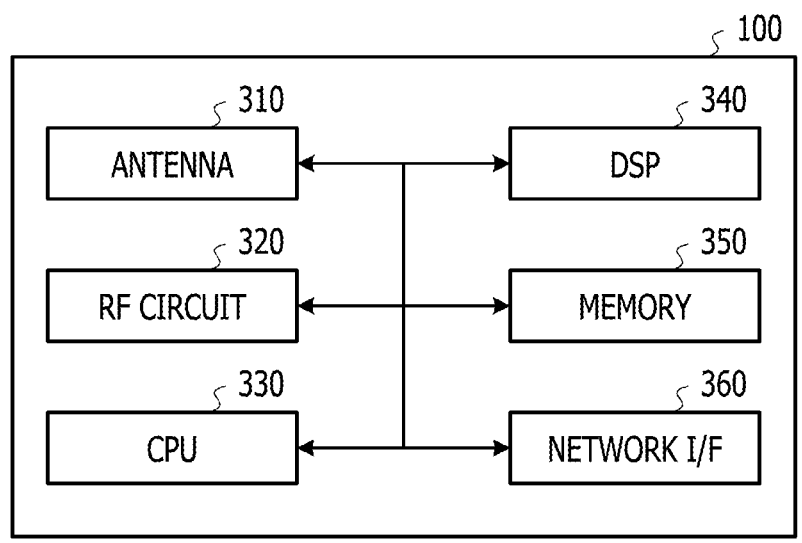
FIG. 15 is an exemplary hardware structure diagram of the base station in the wireless communication system.

FIG. 15 is a diagram illustrating a hardware configuration of the base station 100. As illustrated in FIG. 15, the base station 100 includes, for example, a radio frequency (RF) circuit 320 including an antenna 310, a central processing unit (CPU) 330, a digital signal processor (DSP) 340, a memory 350, and a network interface (I/F) 360 as hardware components. The CPU is coupled to be capable of inputting/outputting various signals and data signals via a bus. The memory 350 includes at least one of a random access memory (RAM) such as a synchronous dynamic random access memory (SDRAM), a read only memory (ROM), and a flash memory, and stores programs, control information, and data signals.

The correspondence between the functional structure of the base station 100 illustrated in FIG. 2 and the hardware structure of the base station 100 illustrated in FIG. 15. The transmission unit 111 and the reception unit 112 (or the communication unit 140) are implemented by, for example, the RF circuit 320, or the antenna 310 and the RF circuit 320. The control unit 120 is implemented by, for example, the CPU 330, the DSP 340, the memory 350, a digital electronic circuit (not illustrated), or the like. Examples of the digital electronic circuit include an application specific integrated circuit (ASIC), a field-programmable gate array (FPGA), a large scale integration (LSI), and the like.

Note that, while multiple data signals to be transmitted in multiple sub bands may be generated in the base station 100, a filter for generating them may be configured independently for each sub band.

Figure 16:
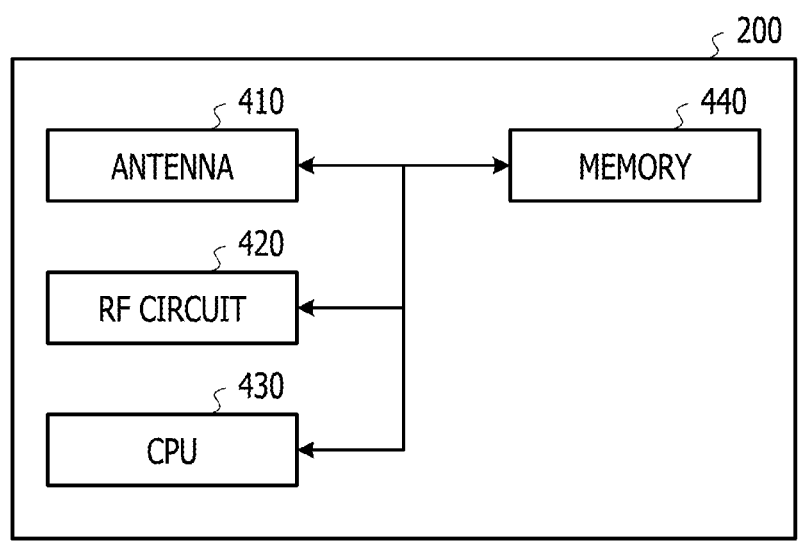
FIG. 16 is an exemplary hardware structure diagram of the terminal in the wireless communication system.

FIG. 16 is a diagram illustrating a hardware structure of the terminal 200. As illustrated in FIG. 16, the terminal 200 includes, for example, an RF circuit 420 including an antenna 410, a CPU 430, and a memory 440 as hardware components. Moreover, the terminal 200 may include a display device such as a liquid crystal display (LCD) coupled to the CPU 430. The memory 440 includes at least one of a RAM such as an SDRAM, a ROM, and a flash memory, and stores programs, control information, and data signals.

The correspondence between the functional structure of the wireless terminal 200 illustrated in FIG. 3 and the hardware structure of the wireless terminal 200 illustrated in FIG. 16. The transmission unit 211 and the reception unit 212 (or the communication unit 240) are implemented by, for example, the RF circuit 420, or the antenna 410 and the RF circuit 420. The control unit 220 is implemented by, for example, the CPU 430, the memory 440, a digital electronic circuit (not illustrated), or the like. Examples of the digital electronic circuit include an ASIC, FPGA, LSI, and the like.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A terminal capable of performing a random access procedure, the terminal comprising:
   a receiver configured to receive a first signal of the random access procedure from a base station;
   controller circuitry configured to control a transmission timing at which a second signal of the random access procedure is transmitted, by applying an offset to a resource that is defined according to configuration information associated with the transmission timing, the offset being selected from a range by the terminal, the range being set by a method different from setting based on the first signal; and
   a transmitter configured to transmit, to the base station, the second signal in an unlicensed band at the transmission timing.

2. The terminal according to claim 1, wherein the first signal is a message 2 of the random access procedure, and the second signal is a message 3 of the random access procedure.

3. The terminal according to claim 1, wherein the controller circuitry is further configured to perform control to transmit the second signal from the transmitter without performing carrier sensing.

4. The terminal according to claim 1, wherein
   the controller circuitry is further configured to perform control to measure presence or absence of transmission at a frequency wider than the unlicensed band that transmits the second signal, and performs control to select the unlicensed band according to a measurement result, and information that indicates the wider frequency is included in the configuration information.

5. The terminal according to claim 1, wherein the configuration information includes information that regards an offset value of the transmission timing, and the offset value is information that indicates a constant multiplication of a predetermined interval from a predetermined timing.

6. The terminal according to claim 1, wherein the configuration information includes information that regards a maximum value of an offset value of the transmission timing, and the controller circuitry is further configured to control the transmission timing by using the offset value with a value that does not exceed the maximum value.

7. The terminal according to claim 1, wherein the configuration information includes first offset information and second offset information, the first offset information includes information that regards an offset value associated with an initial transmission, and the second offset information includes information that regards a transmission interval at a time of continuous transmission.

8. The terminal according to claim 1, wherein the receiver is further configured to receive the configuration information from the base station.

9. The terminal according to claim 8, wherein the configuration information is transmitted from the base station at a timing of transmitting the first signal to be transmitted from the base station.

10. The terminal according to claim 8, wherein the receiver is further configured to receive notification information from the base station, and the notification information includes the configuration information.

11. The terminal according to claim 1, wherein the configuration information further includes information that regards a number of continuous transmissions.

12. The terminal according to claim 1, wherein the range is a range according to a subcarrier spacing.

13. A base station capable of performing a random access procedure, the base station comprising:

a transmitter configured to transmit a first signal of the random access procedure to a terminal; and
a receiver configured to receive a second signal of the random access procedure transmitted in an unlicensed band from the terminal at a transmission timing controlled by applying an offset to a resource that is defined according to configuration information associated with the transmission timing, the offset being selected from a range by the terminal, the range being set by a method different from setting based on the first signal.

14. The base station according to claim 13, wherein the transmitter transmits the configuration information to the terminal.

15. A wireless communication system comprising:
a base station configured to perform a random access procedure; and
a terminal configured to perform the random access procedure, wherein
the terminal includes:
a first receiver configured to receive a first signal of the random access procedure from the base station,
controller circuitry configured to control a transmission timing at which a second signal of the random access procedure is transmitted, by applying an offset to a resource that is defined according to configuration information associated with the transmission timing, the offset being selected from a range by the terminal, the range being set by a method different from setting based on the first signal, and
a first transmitter configured to transmit, to the base station, the second signal in an unlicensed band at the transmission timing, and
the base station includes:
a second transmitter configured to transmit the first signal to the terminal, and
a second receiver configured to receive the second signal from the terminal.

* * * * *